(12) United States Patent
Kendrick et al.

(10) Patent No.: US 11,435,143 B2
(45) Date of Patent: Sep. 6, 2022

(54) BURNER SYSTEM WITH DISCRETE TRANSVERSE FLAME STABILIZERS

(71) Applicant: CLEARSIGN TECHNOLOGIES CORPORATION, Tulsa, OK (US)

(72) Inventors: Donald Kendrick, Bellevue, WA (US); James K. Danise, Renton, WA (US); Douglas W. Karkow, Manchester, IA (US); Christopher A. Wiklof, Everett, WA (US)

(73) Assignee: Clearsign Technologies Corporation, Tulsa, OK (US)

( * ) Notice: Subject to any disclaimer, the term of this patent is extended or adjusted under 35 U.S.C. 154(b) by 646 days.

(21) Appl. No.: 16/166,509

(22) Filed: Oct. 22, 2018

(65) Prior Publication Data

US 2019/0107331 A1 Apr. 11, 2019

Related U.S. Application Data

(63) Continuation of application No. PCT/US2017/030252, filed on Apr. 28, 2017.

(60) Provisional application No. 62/329,525, filed on Apr. 29, 2016.

(51) Int. Cl.
*F27D 99/00* (2010.01)
*F23D 14/14* (2006.01)
*F23D 14/58* (2006.01)
*F23C 99/00* (2006.01)
(Continued)

(52) U.S. Cl.
CPC ........ *F27D 99/0033* (2013.01); *F23C 99/006* (2013.01); *F23D 14/145* (2013.01); *F23D 14/26* (2013.01); *F23D 14/58* (2013.01); *F23D 14/586* (2013.01); *F23D 14/70* (2013.01); *F23C 2900/99001* (2013.01); *F23D 14/148* (2021.05);
(Continued)

(58) Field of Classification Search
CPC ........ F23D 14/14; F23D 14/145; F23D 14/16; F23D 14/26; F27D 99/0033
USPC .................................... 431/6, 328, 350, 354
See application file for complete search history.

(56) References Cited

U.S. PATENT DOCUMENTS

| | | |
|---|---|---|
| 2,095,065 A | 10/1937 | Hays |
| 3,076,605 A | 2/1963 | Holden |
| 3,155,142 A | 11/1964 | Stack |

(Continued)

FOREIGN PATENT DOCUMENTS

| | | |
|---|---|---|
| CN | 104884866 A | 9/2015 |
| CN | 105637293 | 4/2018 |

(Continued)

OTHER PUBLICATIONS

International Search Report and Written Opinion dated Sep. 1, 2017 for PCT International Patent Application Mo. PCT/US2017/030252 filed Apr. 28, 2017, 11 pages.

(Continued)

*Primary Examiner* — Vivek K Shirsat
(74) *Attorney, Agent, or Firm* — Launchpad IP, Inc.; Christopher A. Wiklof; James Larsen

(57) ABSTRACT

A combustion system includes a fuel and oxidant source and a flame holder. The flame holder includes a plurality of discrete slats arranged in parallel defining combustion channels between adjacent slats. The fuel and oxidant source outputs fuel and oxidant into the combustion channels. The flame holder holds a combustion reaction of the fuel and oxidant in the combustion channels.

36 Claims, 13 Drawing Sheets

(51) Int. Cl.
*F23D 14/26* (2006.01)
*F23D 14/70* (2006.01)

(52) U.S. Cl.
CPC .............. *F23D 2203/104* (2013.01); *F27D 2099/0045* (2013.01); *Y02E 20/34* (2013.01)

(56) References Cited

U.S. PATENT DOCUMENTS

| | | | |
|---|---|---|---|
| 3,277,948 A * | 10/1966 | Best | F23D 14/145 |
| | | | 431/328 |
| 3,324,924 A | 6/1967 | Hailstone et al. | |
| 3,358,731 A | 12/1967 | Donnelly | |
| 3,663,154 A | 5/1972 | Locke | |
| 3,847,536 A | 11/1974 | Lepage | |
| 4,021,188 A | 5/1977 | Yamagishi et al. | |
| 4,081,958 A | 4/1978 | Schelp | |
| 4,408,461 A | 10/1983 | Bruhwiler et al. | |
| 4,483,673 A | 11/1984 | Murai et al. | |
| 4,588,373 A | 5/1986 | Tonon et al. | |
| 4,643,667 A | 2/1987 | Fleming | |
| 4,652,236 A | 3/1987 | Viessmann | |
| 4,673,349 A | 6/1987 | Abe et al. | |
| 4,726,767 A | 2/1988 | Nakajima | |
| 4,752,213 A | 6/1988 | Grochowski et al. | |
| 4,773,847 A | 9/1988 | Shukla et al. | |
| 5,049,065 A * | 9/1991 | Smith | F23D 14/46 |
| | | | 431/328 |
| 5,326,257 A | 7/1994 | Taylor et al. | |
| 5,343,693 A | 9/1994 | Komatsu et al. | |
| 5,375,999 A | 12/1994 | Aizawa et al. | |
| 5,409,375 A | 4/1995 | Butcher | |
| 5,441,402 A | 8/1995 | Reuther et al. | |
| 5,641,282 A | 6/1997 | Lee et al. | |
| 5,685,708 A * | 11/1997 | Palmer-Jones | F23D 14/30 |
| | | | 431/114 |
| 5,993,192 A | 11/1999 | Schmidt et al. | |
| 6,129,545 A | 10/2000 | Kahlke et al. | |
| 6,140,658 A | 10/2000 | Jarvinen | |
| 6,162,049 A | 12/2000 | Pellizzari et al. | |
| 6,561,793 B1 | 5/2003 | Narasimhan | |
| 6,575,536 B2 * | 6/2003 | Chen | B60B 3/145 |
| | | | 301/35.54 |
| 6,997,701 B2 | 2/2006 | Volkert et al. | |
| 7,241,137 B2 | 7/2007 | Leinemann et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 9,562,682 B2 | 2/2017 | Karkow et al. | |
| 9,797,595 B2 | 10/2017 | Karkow et al. | |
| 9,803,855 B2 | 10/2017 | Karkow et al. | |
| 9,828,288 B2 | 11/2017 | Colannino et al. | |
| 9,857,076 B2 | 1/2018 | Karkow et al. | |
| 9,885,496 B2 | 2/2018 | Karkow et al. | |
| 10,066,833 B2 | 9/2018 | Colannino et al. | |
| 10,066,835 B2 | 9/2018 | Karkow et al. | |
| 10,077,899 B2 | 9/2018 | Karkow et al. | |
| 10,088,153 B2 | 10/2018 | Colannino et al. | |
| 10,088,154 B2 | 10/2018 | Colannino et al. | |
| 10,125,979 B2 | 11/2018 | Colannino et al. | |
| 2003/0054313 A1 | 3/2003 | Rattner | |
| 2006/0008755 A1 | 1/2006 | Leinemann et al. | |
| 2006/0141413 A1 | 6/2006 | Masten et al. | |
| 2007/0020567 A1 | 1/2007 | Branston et al. | |
| 2007/0186872 A1 | 8/2007 | Shellenberger et al. | |
| 2008/0124666 A1 | 5/2008 | Stocker et al. | |
| 2008/0268387 A1 | 10/2008 | Saito et al. | |
| 2010/0178219 A1 | 7/2010 | Verykios et al. | |
| 2011/0111356 A1 | 5/2011 | Claerbout et al. | |
| 2012/0164590 A1 | 6/2012 | Mach | |
| 2012/0231398 A1 | 9/2012 | Carpentier et al. | |
| 2014/0227646 A1 | 8/2014 | Krichtafovitch | |
| 2015/0010872 A1 | 1/2015 | Schindler et al. | |
| 2015/0276217 A1 | 10/2015 | Karkow et al. | |
| 2015/0330625 A1 | 11/2015 | Karkow et al. | |
| 2016/0003471 A1 | 1/2016 | Karkow et al. | |
| 2016/0046524 A1 | 2/2016 | Colannino et al. | |
| 2016/0238242 A1 | 8/2016 | Karkow et al. | |
| 2016/0298840 A1 | 10/2016 | Karkow et al. | |
| 2016/0348899 A1 | 12/2016 | Karkow et al. | |
| 2016/0348900 A1 | 12/2016 | Colannino et al. | |
| 2016/0348901 A1 | 12/2016 | Karkow et al. | |
| 2017/0010019 A1 | 1/2017 | Karkow et al. | |
| 2017/0038063 A1 | 2/2017 | Colannino et al. | |
| 2017/0146232 A1 | 5/2017 | Karkow et al. | |
| 2017/0191655 A1 | 7/2017 | Colannino et al. | |
| 2017/0268772 A1 | 9/2017 | Lang, Sr. et al. | |
| 2017/0307212 A1 | 10/2017 | Kendrick | |
| 2017/0350591 A1 | 12/2017 | Karkow et al. | |
| 2018/0003378 A1 | 1/2018 | Karkow et al. | |
| 2018/0017249 A1 | 1/2018 | Karkow et al. | |
| 2018/0023807 A1 | 1/2018 | Karkow et al. | |
| 2018/0023810 A1 | 1/2018 | Karkow et al. | |
| 2018/0038588 A1 | 2/2018 | Karkow et al. | |
| 2018/0038589 A1 | 2/2018 | Karkow et al. | |
| 2018/0066846 A1 | 3/2018 | Karkow et al. | |
| 2018/0087774 A1 | 3/2018 | Karkow et al. | |
| 2018/0202653 A1 | 7/2018 | Karkow | |

FOREIGN PATENT DOCUMENTS

| | | |
|---|---|---|
| EP | 3097365 | 11/2016 |
| GB | 2290608 | 1/1996 |
| WO | WO 1995/000803 | 1/1995 |
| WO | WO 2014/127305 | 8/2014 |
| WO | WO 2014/127311 | 8/2014 |
| WO | WO 2015/042613 | 3/2015 |
| WO | WO 2015/042614 | 3/2015 |
| WO | WO 2015/054323 | 4/2015 |
| WO | WO 2015/112950 | 7/2015 |
| WO | WO 2015/123149 | 8/2015 |
| WO | WO 2015/123694 | 8/2015 |
| WO | WO 2015/123701 | 8/2015 |
| WO | WO 2016/007564 | 1/2016 |

OTHER PUBLICATIONS

First Chinese Office Action for Application No. 201780016806.1 dated Jun. 5, 2019.

Second Chinese Office Action for Application No. 201780016806.1 dated Dec. 6, 2019.

Arnold Schwarzenegger, "A Low NOx Porous Ceramics Burner Performance Study," California Energy Commission Public Interest Energy Research Program, Dec. 2007, San Diego State University Foundation, p. 5.

Howell, J.R., et al., "Combustion of Hydrocarbon Fuels Within Porous Inert Media," Dept. of Mechanical Engineering, The University of Texas at Austin. Prog. Energy Combust. Sci., 1996, vol. 22, p. 121-145.

* cited by examiner

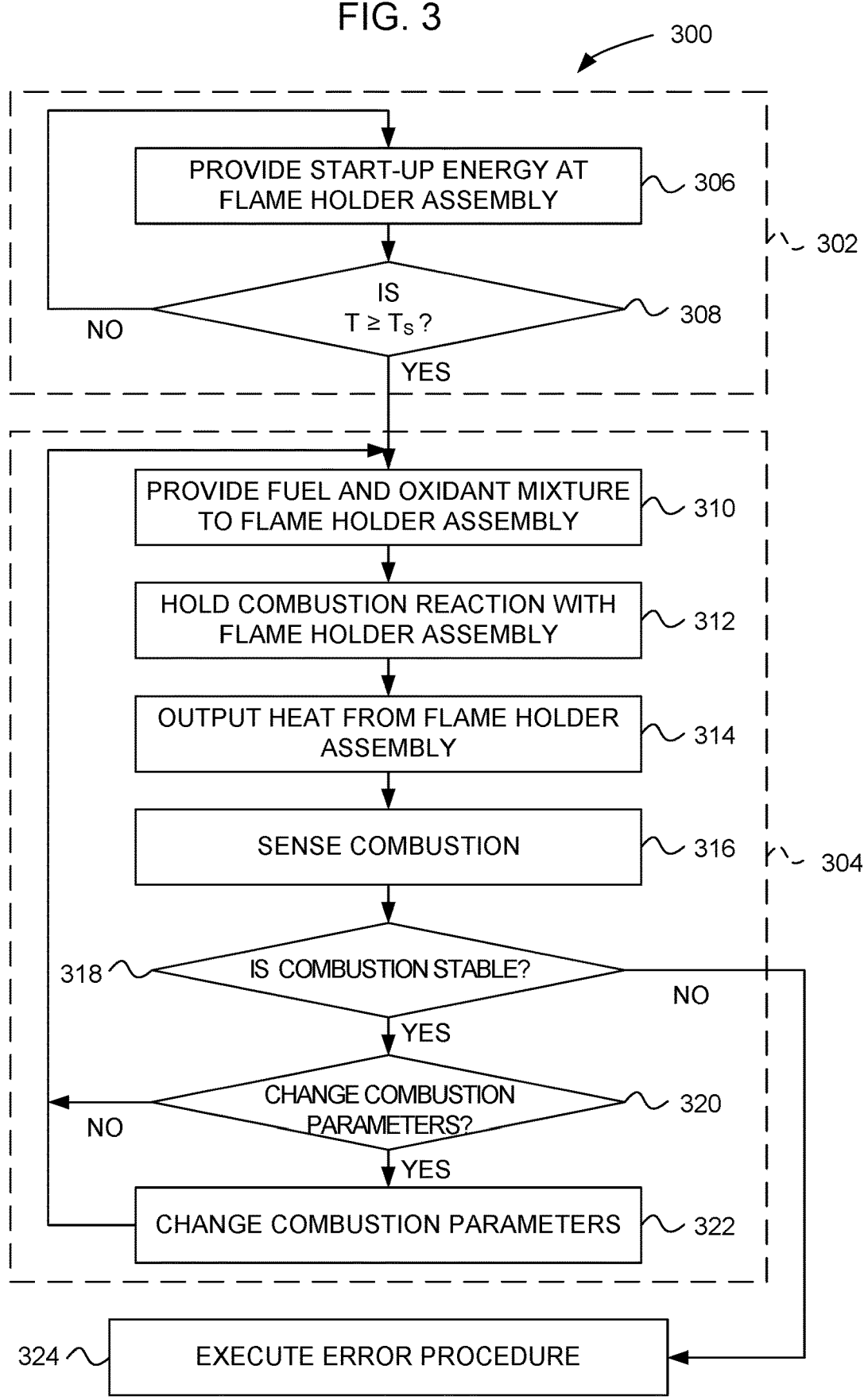

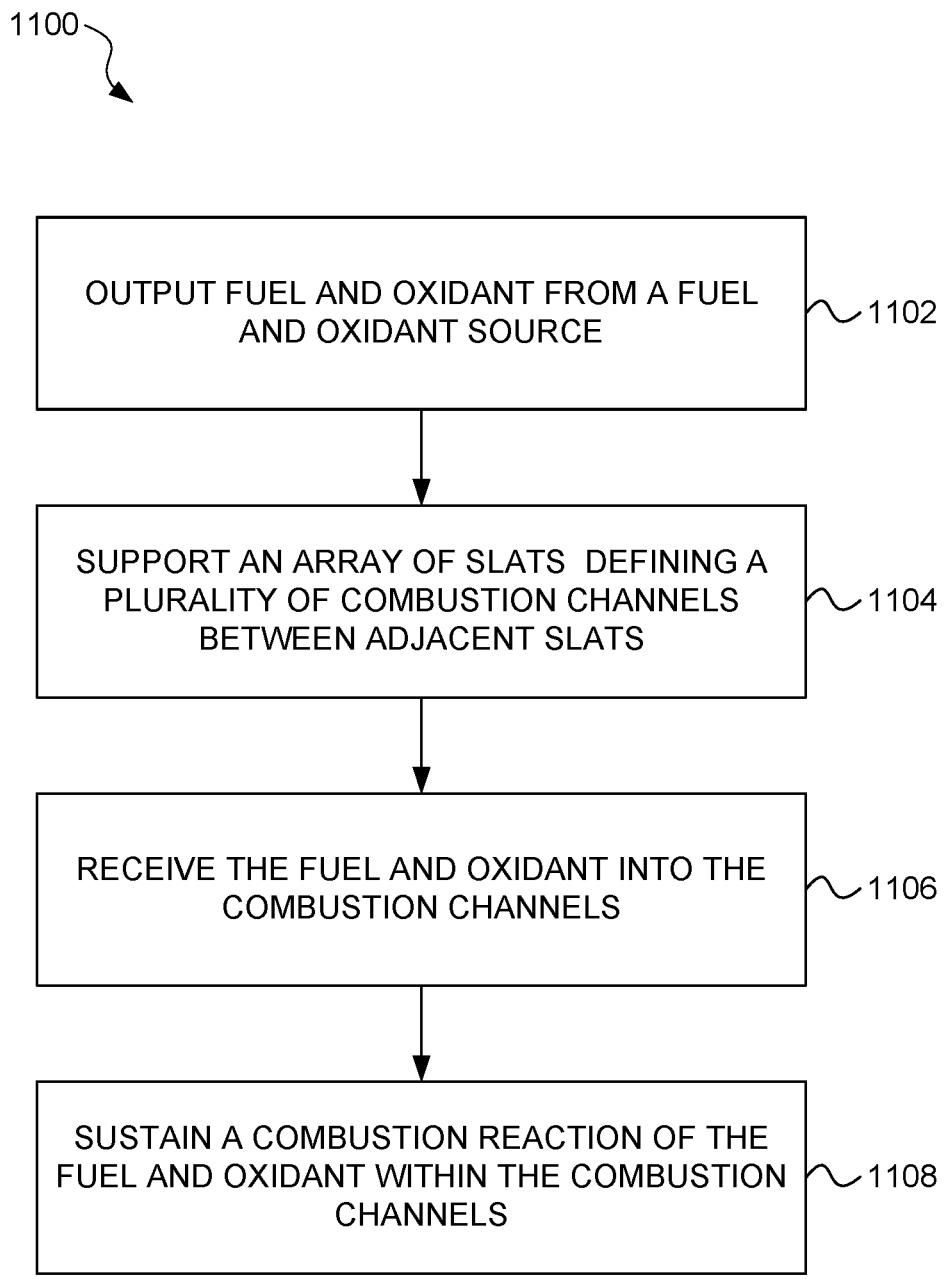

BURNER SYSTEM WITH DISCRETE TRANSVERSE FLAME STABILIZERS

CROSS REFERENCE TO RELATED APPLICATIONS

The present application is a U.S. Continuation application which claims priority benefit under 35 U.S.C. § 120 of International Patent Application No. PCT/US2017/030252, entitled "BURNER SYSTEM WITH DISCRETE TRANSVERSE FLAME STABILIZERS," filed Apr. 28, 2017; which application claims priority benefit from U.S. Provisional Patent Application No. 62/329,525, entitled "BURNER SYSTEM WITH DISCRETE TRANSVERSE FLAME STABILIZERS," filed Apr. 29, 2016, each of which, to the extent not inconsistent with the disclosure herein, is incorporated by reference.

SUMMARY

According to an embodiment, a combustion system includes a flame holder and a fuel and oxidant source configured to output fuel and oxidant. The flame holder includes a support structure and a plurality of slats arranged in parallel with each other. Each slat has a first edge proximal to the fuel and oxidant source and a second edge distal from the fuel and oxidant source. The support structure holds the slats. The slats define a plurality of combustion channels each between respective adjacent slats. Each combustion channel has a width corresponding to a distance between the respective adjacent slats and a length corresponding to a distance between the first edge and the second edge of one of the respective adjacent slats. The flame holder is positioned to receive the fuel and oxidant into the combustion channels and to collectively hold a combustion reaction of the fuel and oxidant within the combustion channels.

According to an embodiment, the length of each combustion channel is at least 5 times the width.

According to an embodiment, a combustion system includes a fuel and oxidant source configured to output fuel and oxidant and a flame holder positioned to receive the fuel and oxidant. The flame holder includes an array of slats arranged in parallel with each other and defining a plurality of combustion channels between adjacent slats. The width of each combustion channel is the distance between adjacent slats. The height of each channel is the height of each slat on an axis corresponding to a general direction of output of the fuel and oxidant from the fuel and oxidant source. The height is at least five times the width. The flame holder is configured to sustain a combustion reaction of the fuel and oxidant within the combustion channels. A support structure holds the array of slats.

According to an embodiment, a method includes outputting fuel and oxidant from a fuel and oxidant source and supporting a plurality of slats adjacent to the fuel and oxidant source. The slats define a plurality of combustion channels between adjacent slats. The width of the combustion channels corresponds to a distance between adjacent slats. The height of the combustion channels corresponds to a height of the slats along an axis of output of the fuel and oxidant. The method further includes receiving the fuel and oxidant into the combustion channels and sustaining a combustion reaction of the fuel and oxidant within the combustion channels.

BRIEF DESCRIPTION OF THE DRAWINGS

FIG. 3 is a flow diagram of a process for operating a combustion system including a flame holder, according to an embodiment.

FIG. 11 is a flow diagram of a process for operating a combustion system, according to an embodiment.

DETAILED DESCRIPTION

Figure 1:
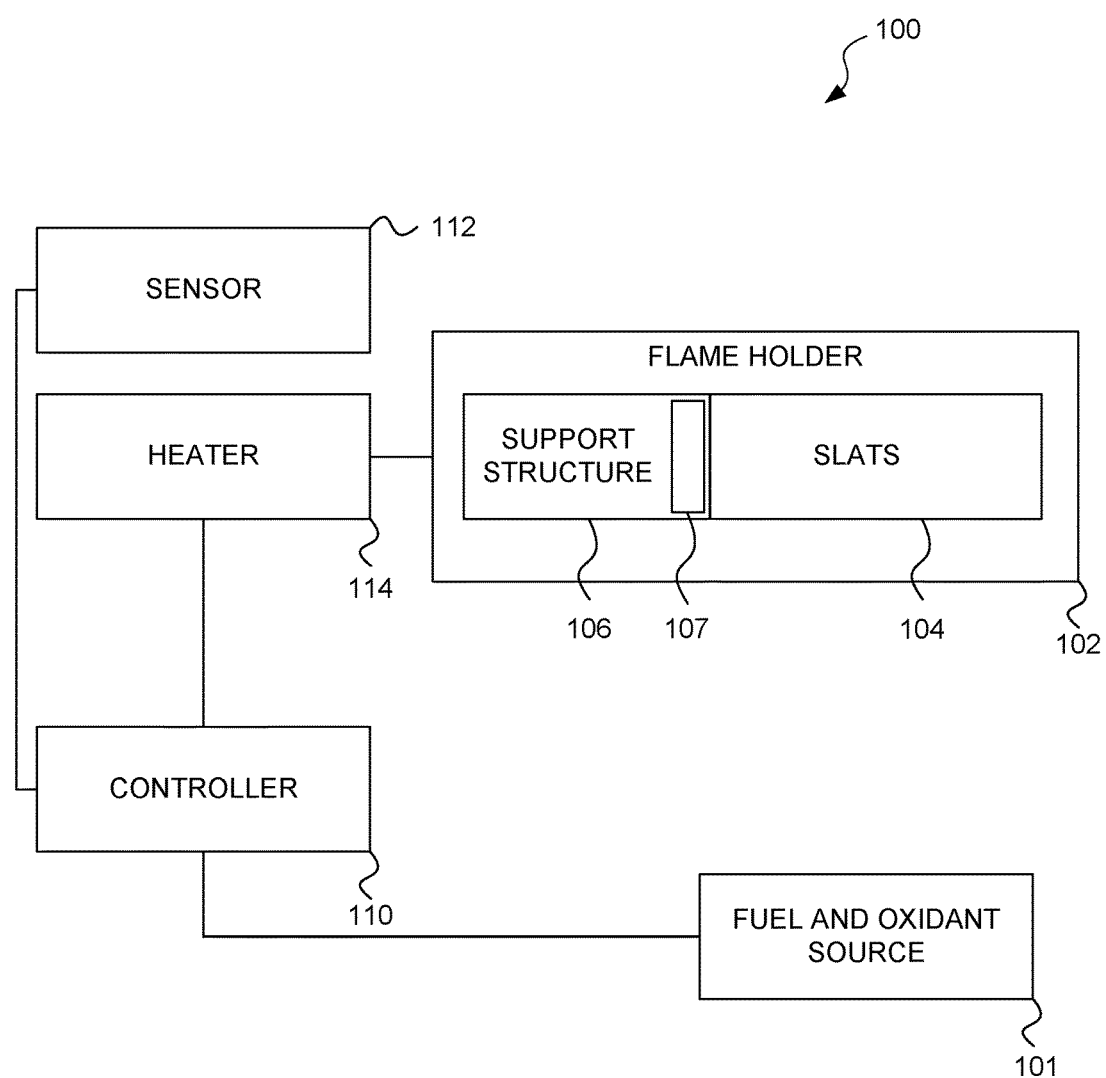
FIG. 1 is a block diagram of a combustion system including a flame holder, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a block diagram of a combustion system 100, according to an embodiment. The combustion system 100 includes a fuel and oxidant source 101 and a flame holder 102. The flame holder 102 includes a plurality of slats 104 and a support structure 106. The combustion system 100 further includes a controller 110, a sensor 112, and a heater 114.

The fuel and oxidant source 101 is configured to output fuel and oxidant onto the flame holder 102. The flame holder 102 sustains a combustion reaction of the fuel and oxidant primarily within the flame holder 102.

According to an embodiment, the slats 104 are arranged in an array extending in a direction transverse to a direction of output of the fuel and oxidant from the fuel and oxidant source 101. The slats 104 are discrete slats positioned in parallel with each other. In particular, each slat 104 is separated from the next slat 104 by a selected distance. The arrangement of slats 104 in parallel defines a plurality of combustion channels between the slats 104. Each combustion channel has a width that is the distance between adjacent slats 104.

The fuel and oxidant source 101 outputs the fuel and oxidant toward the flame holder 102. The fuel and oxidant enters into the combustion channels between the slats 104. The flame holder 102 sustains a combustion reaction of the fuel and oxidant primarily within the combustion channels between the slats 104.

According to an embodiment, the height of the combustion channels corresponds to the height of the slats 104 in a direction along an axis of travel of the fuel and oxidant from the fuel and oxidant source 101. According to an embodiment, the height of the combustion channels is at least five times the width of the combustion channels.

The support structure 106 holds the slats 104 in a selected position relative to the fuel and oxidant source 101. Additionally, the support structure 106 holds the slats 104 in position relative to each other. Thus, the support structure 106 holds the slats 104 in an array in which the slats 104 extend parallel to each other and define the combustion channels between adjacent slats 104.

According to an embodiment, the flame holder 102 is configured to hold a majority of the combustion reaction of the fuel and oxidant within the combustion channels. For example, on a steady-state basis, more than half the molecules of fuel output by the fuel and oxidant source 101 may be converted to combustion products between the input face and the output face of the flame holder 102. According to an alternative interpretation, more than half of the heat output by the combustion reaction may be output between the input face and the output face of the flame holder 102. Under nominal operating conditions, the combustion channels can be configured to collectively hold at least 80% of the combustion reaction between the input face and the output face of the flame holder 102. In some experiments, the inventors produced a combustion reaction that was apparently wholly contained in the combustion channels between the input face and the output face of the flame holder 102. According to an alternative interpretation, the flame holder 102 can support combustion between the input face and output face when combustion is "time-averaged." For example, during transients, such as before the flame holder 102 is fully heated, or if too high a (cooling) load is placed on the system, the combustion may travel somewhat downstream from the output face of the flame holder 102.

While a "flame" is described in a manner intended for ease of description, it should be understood that in some instances, no visible flame is present. Combustion occurs primarily within the combustion channels, but the "glow" of combustion heat is dominated by a visible glow of the flame holder 102 itself. In other instances, the inventors have noted transient "huffing" wherein a visible flame momentarily ignites in a region lying between the input face of the flame holder 102 and the fuel and oxidant source 101, within a dilution region. Such transient huffing is generally short in duration such that, on a time-averaged basis, a majority of combustion occurs within the combustion channels of the flame holder 102, between the input face and the output face. In still other instances, the inventors have noted apparent combustion occurring above the output face of the flame holder 102, but still a majority of combustion occurred within the flame holder 102 as evidenced by the continued visible glow (a visible wavelength tail of blackbody radiation) from the flame holder 102.

The flame holder 102 can be configured to receive heat from the combustion reaction and to output a portion of the received heat as thermal radiation to heat-receiving structures (e.g., furnace walls and/or radiant section working fluid tubes) in or adjacent to the combustion volume. As used herein, terms such as thermal radiation, infrared radiation, radiant heat, heat radiation, etc. are to be construed as being substantially synonymous, unless further definition is provided. Specifically, such terms refer to blackbody radiation of electromagnetic energy, primarily in infrared wavelengths.

According to an embodiment, the slats 104 include a refractory material. The refractory material can include one or more of Mullite, Cordierite, silicon carbide, zirconia, fused quartz, and fiber reinforced cementatious material.

According to an embodiment, the support structure 106 includes a refractory material. The refractory material can include one or more of Mullite, Cordierite, silicon carbide, zirconia, fused quartz, and fiber reinforced cementatious material.

According to an embodiment, the support structure 106 includes a rotation device 107 configured to rotate the slats 104 to change the dimensions of the combustion channels or to close off the combustion channels altogether.

While FIG. 1 and the related description have described a flame holder 102 including a plurality of slats 104, the flame holder 102 can include elongated members other than slats 104.

Figure 2A:
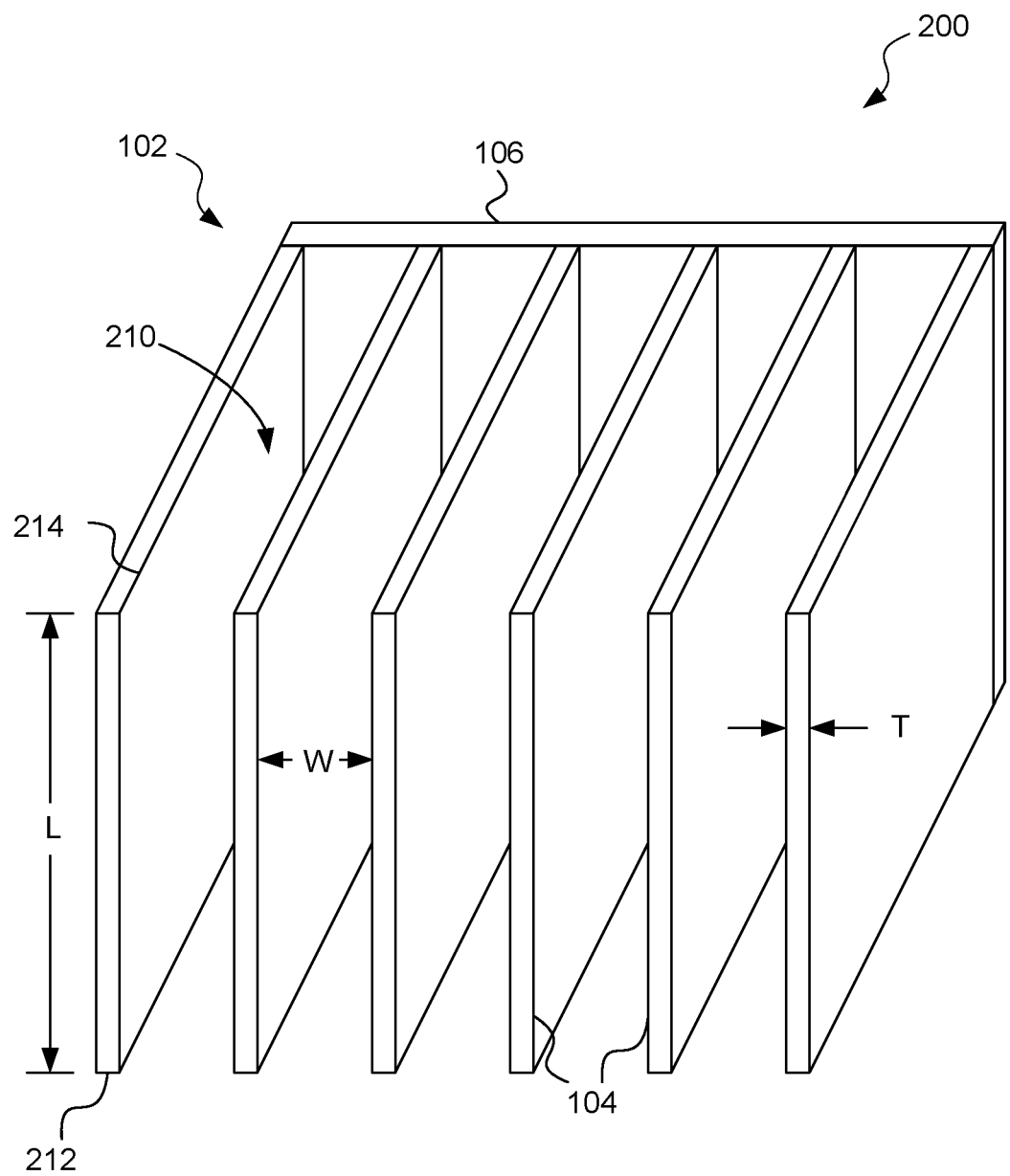
FIG. 2A is a perspective view of a flame holder including a plurality of slats, according to an embodiment.

FIG. 2A is a perspective view of a combustion system 200 including a flame holder 102, according to an embodiment. The flame holder 102 includes a plurality of discrete slats 104 positioned in parallel with each other and supported by the support structure 106.

According to an embodiment, the slats 104 are arranged in parallel with each other. Each slat 104 is separated from adjacent slats 104 by distance W. The arrangement of the slats 104 defines a plurality of combustion channels 210 between adjacent slats 104. The width W of each combustion channel 210 is the distance between adjacent slats 104. The height L of each combustion channel 210 corresponds to a height of the slats 104. Each slat 104 has a thickness T.

Though the fuel and oxidant source 101 is not pictured in FIG. 2A, the fuel and oxidant source 101 is positioned below the flame holder 102 in the embodiment of FIG. 2A. The fuel and oxidant source 101 outputs fuel and oxidant onto the flame holder 102. The fuel and oxidant enters into the combustion channels 210. The flame holder 102 sustains a combustion reaction of the fuel and oxidant within the combustion channels 210.

According to an embodiment, each slat 104 can include a first edge 212 and a second edge 214. The first edge 212 is positioned proximal to the fuel and oxidant source 101. The second edge 214 is positioned distal from the fuel and oxidant source 101.

According to an embodiment, the support structure 106 includes a second portion not shown in FIG. 2A. In particular, the support structure 106 may include a second portion coupled opposite from the portion shown in FIG. 2A, at opposite ends of the slats 104 relative to the portion of the support structure 106 shown in FIG. 2A.

Though FIG. 2A discloses that the combustion channels 210 each have the same width W and height H, according to an embodiment each combustion channel 210 can have a different width W and a different length L. Thus, the slats 104 can be separated by various distances and can have differing dimensions such that the length L of combustion channels 210 can vary.

According to an embodiment, the flame holder 102 can be differently oriented than has been shown in FIG. 1 and FIG. 2A. For example, the fuel and oxidant source 101 can be positioned laterally from the flame holder 102 and oriented such that the fuel and oxidant source 101 outputs fuel and oxidant horizontally and the flame holder 102 would be at an orientation rotated 90° from that shown in FIG. 2A such that the fuel and oxidant can enter into the channels 210. Thus, the length L would not correspond to a vertical distance, but a horizontal distance.

Figure 2B:
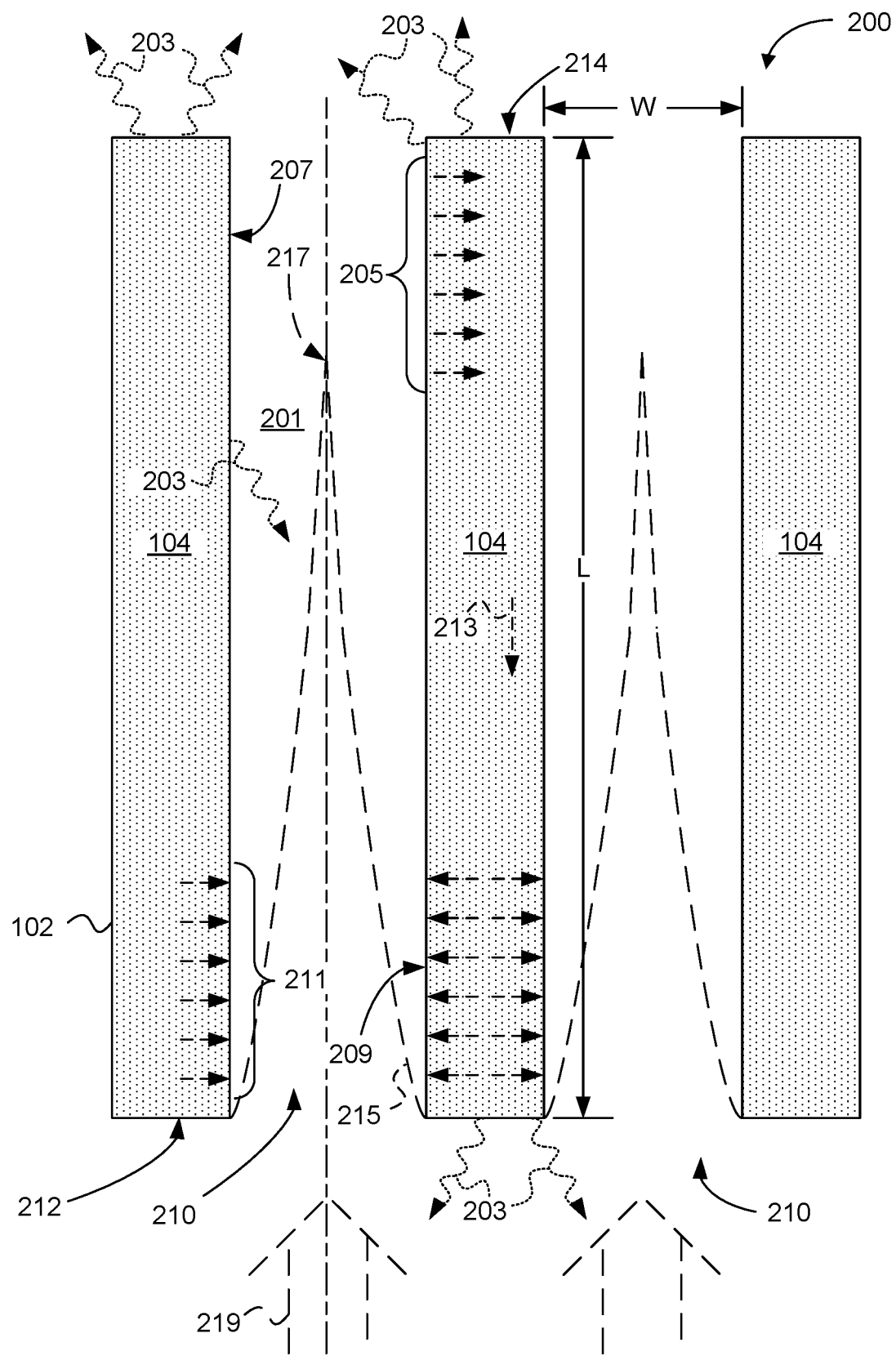
FIG. 2B is a cross-sectional view of the slats of FIG. 2A, according to an embodiment.

FIG. 2B is an enlarged cross sectional view of a portion of the flame holder 102, according to an embodiment. The flame holder 102 is aligned to receive fuel and oxidant in a fuel and oxidant mixture 219 from the fuel and oxidant source 101. The flame holder 102 sustains a combustion reaction 201 of the fuel and oxidant within the combustion channels 210, thereby generating heat, a portion of which is received by the flame holder 102. The flame holder 102 outputs a portion of the received heat to the fuel and oxidant mixture 219 received at the first edges 212 of the slats 104. The slats 104 may receive heat from the (exothermic) combustion reaction 201 at least in heat receiving regions 205 of slat sidewalls 207. Experimental evidence has suggested to the inventors that the position of the heat receiving regions 205, or at least the position corresponding to a maximum rate of receipt of heat, can vary along the length of the slat sidewalls 207. In some experiments, the location of maximum receipt of heat was apparently between ⅓ and ½ of the distance from the first edge 212 to the second edge 214 (i.e., somewhat nearer to the first edge 212 than to the second edge 214). The inventors contemplate that the heat receiving regions 205 may lie nearer to the second edge 214 of the flame holder 102 under other conditions. Most probably, there is no clearly defined edge of the heat receiving regions 205 (or for that matter, the heat output regions 211, described below). For ease of understanding, the heat receiving regions 205 and the heat output regions 211 will be described as particular regions 205, 211.

The slats 104 can be characterized by a heat capacity. The slats 104 may hold heat from the combustion reaction 201 in an amount corresponding to the heat capacity times temperature rise, and transfer the heat from the heat receiving regions 205 to heat output regions 211 of the slat sidewalls 207. Generally, the heat output regions 211 are nearer to the first edge 212 than are the heat receiving regions 205. According to one interpretation, the slats 104 can transfer heat from the heat receiving regions 205 to the heat output regions 211 via thermal radiation, depicted graphically as 203. According to another interpretation, the slats 104 can transfer heat from the heat receiving regions 205 to the heat output regions 211 via heat conduction along heat conduction paths 213. The inventors contemplate that both radiation and conduction heat transfer mechanisms may be operative in transferring heat from the heat receiving regions 205 to the heat output regions 211. In this way, the flame holder 102 may act as a heat source to maintain the combustion reaction 201, even under conditions where a combustion reaction 201 would not be stable when supported from a conventional flame holder.

The inventors believe that the flame holder 102 causes the combustion reaction 201 to occur within thermal boundary layers 215 formed adjacent to walls 209 of the combustion channels 210. As the relatively cool fuel and oxidant mixture 219 approaches the first edge 212, the flow is split into portions that respectively travel through individual combustion channels 210. The hot slats 104 transfer heat to the fluid, notably within thermal boundary layers 215 that progressively thicken as more and more heat is transferred to the incoming fuel and oxidant mixture 219. After reaching a combustion temperature (e.g., the auto-ignition temperature of the fuel), the reactants continue to flow while a chemical ignition delay time elapses, over which time the combustion reaction 201 occurs. Accordingly, the combustion reaction 201 is shown as occurring within the thermal boundary layers 215. As flow progresses, the thermal boundary layers 215 merge at a merger point 217. Ideally, the merger point 217 lies between the first edge 212 and second edge 214 that defines the ends of the combustion channels 210. At some point, the combustion reaction 201 causes the flowing gas (and plasma) to output more heat to the slats 104 than it receives from the slats 104. The heat is received at the heat receiving region 205, is held by the slats 104, and is transported to the heat output region 211 nearer to the first edge 212, where the heat recycles into the cool reactants (and any included diluent) to raise them to the combustion temperature.

In an embodiment, the plurality of combustion channels 210 are each characterized by a length L defined as a reaction fluid propagation path length from the first edge 212 to the second edge 214 of one of the slats 104. The reaction fluid includes the fuel and oxidant mixture 219 (optionally including nitrogen, flue gas, and/or other "non-reactive" species), reaction intermediates (including transition states in a plasma that characterizes the combustion reaction 201), and reaction products.

The plurality of combustion channels 210 can be each characterized by a transverse width W between opposing slat sidewalls 207. The inventors have found that stable combustion can be maintained in the flame holder 102 if the length L of each combustion channel 210 is at least four times the transverse dimension W of the combustion channel 210. In other embodiments, the length L can be greater than six times the transverse dimension W. For example, experiments have been run where L is at least eight, at least twelve, at least sixteen, and at least twenty-four times the transverse dimension W. Preferably, the length L is sufficiently long for thermal boundary layers 215 formed adjacent to the slat sidewalls 207 in a reaction fluid flowing through the combustion channels 210 to converge at merger points 217 within the combustion channels 210 between the first edge 212 and the second edge 214 of the flame holder 102. In experiments, the inventors have found L/W ratios above 5 work well, and that ratios between 12 and 38 work particularly well (i.e., produce low NOx, produce low CO, and maintain stable combustion).

The slats 104 can be configured to convey heat between adjacent combustion channels 210. The heat conveyed between adjacent combustion channels 210 can be selected to cause heat output from the combustion reaction portion 201 in a first combustion channel 210 to supply heat to stabilize a combustion reaction portion 201 in an adjacent combustion channel 210.

Referring especially to FIG. 1, the fuel and oxidant source 101 can further include a fuel nozzle, configured to output fuel, and an oxidant source configured to output a fluid including the oxidant. For example, the fuel nozzle can be configured to output pure fuel. The oxidant source can be configured to output combustion air carrying oxygen, and optionally, flue gas.

The flame holder 102 can be held by a flame holder support structure 106 configured to hold the flame holder 102 at a dilution distance $D_D$ away from the fuel nozzle. The fuel nozzle can be configured to emit a fuel jet selected to entrain the oxidant to form the fuel and oxidant mixture 219 as the fuel jet and oxidant travel along a path to the flame holder 102 through the dilution distance $D_D$ between the fuel nozzle and the flame holder 102. Additionally, or alternatively (particularly when a blower is used to deliver oxidant contained in combustion air), the oxidant or combustion air source can be configured to entrain the fuel and the fuel and oxidant travel through the dilution distance $D_D$. In some embodiments, a flue gas recirculation path can be provided. Additionally, or alternatively, the fuel nozzle can be configured to emit a fuel jet selected to entrain the oxidant and to entrain flue gas as the fuel jet travels through the dilution distance $D_D$ between the fuel nozzle and the first edge 212 of the flame holder 102.

The fuel nozzle can be configured to emit the fuel through one or more fuel orifices having an inside diameter dimension that is referred to as "nozzle diameter." The flame holder support structure 106 can support the flame holder 102 to receive the fuel and oxidant mixture 219 at the distance $D_D$ away from the fuel nozzle greater than 20 times the nozzle diameter. In another embodiment, the flame holder 102 is disposed to receive the fuel and oxidant mixture 219 at the distance $D_D$ away from the fuel nozzle between 100 times and 1100 times the nozzle diameter. Preferably, the flame holder support structure 106 is configured to hold the flame holder 102 at a distance about 200 times or more of the nozzle diameter away from the fuel nozzle. When the fuel and oxidant mixture 219 travels about 200 times the nozzle diameter or more, the fuel and oxidant mixture 219 is sufficiently homogenized to cause the combustion reaction 201 to produce minimal NOx.

The fuel and oxidant source 101 can alternatively include a premix fuel and oxidant source, according to an embodiment. A premix fuel and oxidant source 101 can include a premix chamber (not shown), a fuel nozzle configured to output fuel into the premix chamber, and an oxidant (e.g., combustion air) channel configured to output the oxidant into the premix chamber. A flame arrestor can be disposed between the premix fuel and oxidant source 101 and the flame holder 102 and be configured to prevent flame flashback into the premix fuel and oxidant source 101.

The oxidant source, whether configured for entrainment in the combustion volume or for premixing, can include a blower configured to force the oxidant through the fuel and oxidant source 101.

The support structure 106 can be configured to support the flame holder 102 from a floor or wall (not shown) of the combustion volume, for example. In another embodiment, the support structure 106 supports the flame holder 102 from the fuel and oxidant source 101. Alternatively, the support structure 106 can suspend the flame holder 102 from an overhead structure (such as a flue, in the case of an up-fired system). The support structure 106 can support the flame holder 102 in various orientations and directions.

The support structure 106 can be configured to support the plurality of flame holder sections. The flame holder support structure 106 can include a metal superalloy, a cementatious, and/or ceramic refractory material. In an embodiment, the plurality of adjacent flame holder sections can be joined with a fiber reinforced refractory cement.

Referring again to both FIGS. 1 and 2B, the combustion channels 210 can be of various shapes, based on the shapes and positions of the slats 104. In an embodiment, the combustion channels 210 can include elongated squares, each having a width W. In another embodiment, the combustion channels 210 can include elongated hexagons, each having a width W between opposing sides of the hexagons. In another embodiment, the combustion channels 210 can include truncated cones or truncated pyramids (e.g., frustums), each having a variable width W. Alternatively, the width W can be defined as the shortest distance between the two adjacent slats 104 defining the combustion channel 210. In some embodiments, the combustion channels 210 can each have a lateral dimension D equal to or greater than a quenching distance of the flame based on standard reference conditions. Alternatively, the combustion channels 210 may have lateral dimension D less than a standard reference quenching distance.

In one range of embodiments, each of the plurality of combustion channels 210 has a lateral dimension D between 0.05 inch and 1.0 inch. Preferably, each of the plurality of combustion channels 210 has a lateral dimension D between 0.1 inch and 0.5 inch. For example, the plurality of combustion channels 210 can each have a lateral dimension D of about 0.2 to 0.4 inch.

The void fraction of a flame holder 102 is defined as the total volume of all combustion channels 210 in a section of the flame holder 102 divided by a total volume of the flame holder 102 including the slats 104 and combustion channels 210. The flame holder 102 should have a void fraction between 0.10 and 0.90. In an embodiment, the flame holder 102 can have a void fraction between 0.30 and 0.80. In another embodiment, the flame holder 102 can have a void fraction of about 0.70. Using a void fraction of about 0.70 was found to be especially effective for producing very low NOx.

The flame holder 102 can be formed from a fiber reinforced cast refractory material and/or a refractory material such as an aluminum silicate material. For example, the flame holder 102 can be formed to include mullite or cordierite. Additionally or alternatively, the flame holder body 208 can include a metal superalloy such as Inconel or Hastelloy.

The combustion channels 210 can be parallel to one another and normal to the first and second edges 212, 214. In another embodiment, the combustion channels 210 can be parallel to one another and formed at an angle relative to the first and second edges 212, 214. In another embodiment, the combustion channels 210 can be non-parallel to one another.

In another embodiment, which is not necessarily preferred, the slats 104 may be formed from reticulated ceramic material. The term "reticulated" refers to a netlike structure. Reticulated ceramic material is often made by dissolving a slurry into a sponge of specified porosity, allowing the slurry to harden, and burning away the sponge and curing the ceramic.

In another embodiment, which is not necessarily preferred, the slats 104 may be formed from a ceramic material that has been punched, bored or cast to create channels.

In another embodiment, the flame holder 102 can include a plurality of tubes or pipes bundled together. The plurality of combustion channels 210 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The inventors contemplate various explanations for why burner systems including the flame holder 102 provide such clean combustion.

According to an embodiment, the flame holder 102 may act as a heat source to maintain a combustion reaction 201 even under conditions where a combustion reaction 201 would not be stable when supported by a conventional flame holder 102. This capability can be leveraged to support combustion using a leaner fuel-to-oxidant mixture than is typically feasible. Thus, according to an embodiment, at the point where the fuel stream contacts the first edges 212 of the slats 104, an average fuel-to-oxidant ratio of the fuel stream is below a (conventional) lower combustion limit of the fuel component of the fuel stream—lower combustion limit defines the lowest concentration of fuel at which a fuel and oxidant mixture 219 will burn when exposed to a momentary ignition source under normal atmospheric pressure and an ambient temperature of 25° C. (77° F.).

The flame holder 102 and systems including the flame holder 102 described herein were found to provide substantially complete combustion of CO (single digit ppm down to undetectable, depending on experimental conditions), while supporting low NOx. According to one interpretation, such a performance can be achieved due to a sufficient mixing used to lower peak flame temperatures (among other strategies). Flame temperatures tend to peak under slightly rich conditions, which can be evident in any diffusion flame that is insufficiently mixed. By sufficiently mixing, a homogenous and slightly lean mixture can be achieved prior to combustion. This combination can result in reduced flame temperatures, and thus reduced NOx formation. In one embodiment, "slightly lean" may refer to 3% $O_2$, i.e., an equivalence ratio of ~0.87. Use of even leaner mixtures is possible, but may result in elevated levels of $O_2$. Moreover, the inventors believe that the slats 104 may act as a heat sink for the combustion fluid. This effect may alternatively or additionally reduce combustion temperatures and lower NOx.

According to another interpretation, production of NOx can be reduced if the combustion reaction 201 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the flame holder 102 is very short compared to a conventional flame. The low NOx production associated with flame holder combustion may thus be related to the short duration of time required for the reactants (and entrained nitrogen) to pass through the flame holder 102.

Figure 2C:
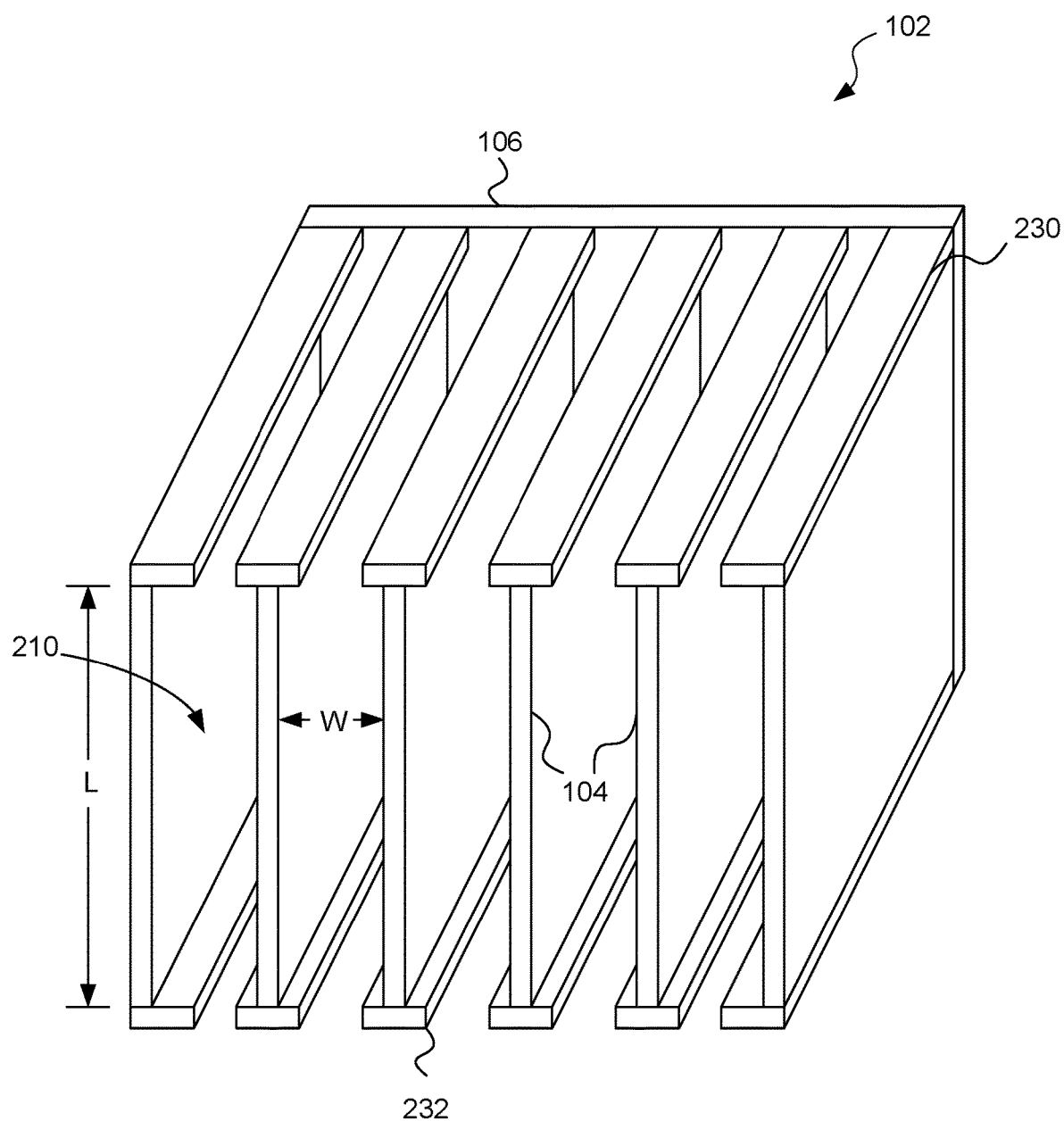
FIG. 2C is a perspective view of a flame holder including a plurality of slats, according to an embodiment.

FIG. 2C is a diagram of a flame holder 102, according to an alternate embodiment. The flame holder 102 of FIG. 2C is substantially similar to the flame holder 102 of FIG. 2A. However, the flame holder 102 of FIG. 2C includes a plurality of top narrowing members 230 each placed on top of respective slat 104. The top narrowing members 230 narrow an exit of the combustion channels 210. Additionally, the flame holder 102 of FIG. 2C includes bottom narrowing members 232 positioned on the bottom of each respective slat 104. The bottom narrowing members 232 narrow the entrances into the combustion channels 210. The top narrowing members 230, and the bottom narrowing members 232 can increase an efficiency of the combustion reaction 201.

In operation, the flame holder 102 of FIG. 2C may improve flame stabilization. For example, a fuel/oxidant may exhibit relatively high velocity at an inlet of the combustion channels 210. The velocity of the fuel/oxidant may then decrease as the fuel/oxidant enters the combustion channels 210 and then increase as the fuel/oxidant enters spaces between the top narrowing members 230 and exits the flame holder 102. Additionally, the fuel/oxidant may form one or more eddies within the combustion channels 210.

According to an embodiment, the flame holder 102 can include the bottom narrowing members 232 and not the top narrowing members 230. Alternatively, the flame holder 102 can include the top narrowing members 230 but not the bottom narrowing members 232.

According to an embodiment, the top narrowing members 230 and the bottom narrowing members 232 have differing dimensions from each other. Alternatively, the top and bottom narrowing members 230, 232 can have substantially similar or identical dimensions.

FIG. 3 is a flow chart showing a method 300 for operating a burner system including the flame holder shown and described herein. To operate a burner system including a flame holder, the flame holder is first heated to a temperature sufficient to maintain combustion of the fuel and oxidant mixture.

According to a simplified description, the method 300 begins with step 302, wherein the flame holder is preheated to a start-up temperature, $T_S$. After the flame holder is raised to the start-up temperature, the method proceeds to step 304, wherein fuel and oxidant are provided to the flame holder and combustion is held by the flame holder.

According to a more detailed description, step 302 begins with step 306, wherein start-up energy is provided at the flame holder. Simultaneously or following providing start-up energy, a decision step 308 determines whether the temperature T of the flame holder is at or above the start-up temperature, $T_S$. As long as the temperature of the flame holder is below its start-up temperature, the method loops between steps 306 and 308 within the preheat step 302. In decision step 308, if the temperature T of at least a predetermined portion of the flame holder is greater than or equal to the start-up temperature, the method 300 proceeds to overall step 304, wherein fuel and oxidant is supplied to and combustion is held by the flame holder.

Step 304 may be broken down into several discrete steps, at least some of which may occur simultaneously.

Proceeding from decision step 308, a fuel and oxidant mixture is provided to the flame holder, as shown in step 310. The fuel and oxidant may be provided by a fuel and oxidant source that includes a separate fuel nozzle and combustion air source, for example. In this approach, the fuel and combustion air are output in one or more directions selected to cause the fuel and combustion air mixture to be received by an input face of the flame holder. The fuel may entrain the combustion air (or alternatively, the combustion air may dilute the fuel) to provide a fuel and oxidant mixture at the input face of the flame holder at a fuel dilution selected for a stable combustion reaction that can be held within the combustion channels of the flame holder.

Proceeding to step 312, the combustion reaction is held by the flame holder.

In step 314, heat may be output from the flame holder. The heat output from the flame holder may be used to power an industrial process, heat a working fluid, generate electricity, or provide motive power, for example.

In optional step 316, the presence of combustion may be sensed. Various sensing approaches have been used and are contemplated by the inventors. Generally, combustion held by the flame holder is very stable and no unusual sensing requirement is placed on the system. Combustion sensing may be performed using an infrared sensor, a video sensor, an ultraviolet sensor, a charged species sensor, thermocouple, thermopile, and/or other known combustion sensing apparatuses. In an additional or alternative variant of step 316, a pilot flame or other ignition source may be provided to cause ignition of the fuel and oxidant mixture in the event combustion is lost at the flame holder.

Proceeding to decision step 318, if combustion is sensed not to be stable, the method 300 may exit to step 324, wherein an error procedure is executed. For example, the error procedure may include turning off fuel flow, re-executing the preheating step 302, outputting an alarm signal, igniting a stand-by combustion system, or other steps. If, in decision step 318, combustion in the flame holder is determined to be stable, the method 300 proceeds to decision step 320, wherein it is determined if combustion parameters should be changed. If no combustion parameters are to be changed, the method loops (within step 304) back to step 310, and the combustion process continues. If a change in combustion parameters is indicated, the method 300 proceeds to step 322, wherein the combustion parameter change is executed. After changing the combustion parameter(s), the method loops (within step 304) back to step 310, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 322. Conversely, if heat demand is increased, then fuel and oxidant flow may be increased. Additionally or alternatively, if the combustion system is in a start-up mode, then fuel and oxidant flow may be gradually increased to the flame holder over one or more iterations of the loop within step 304.

Referring again to FIGS. 1, 2B, the heater 114 is operatively coupled to the flame holder 102. The flame holder 102 operates by outputting heat to the incoming fuel and oxidant mixture 219. After combustion is established, this heat is provided by the combustion reaction 201; but before combustion is established, the heat is provided by the heater 114.

Various heating apparatuses have been used and are contemplated by the inventors. In some embodiments, the heater 114 can include a flame holder 102 configured to support a flame disposed to heat the flame holder 102. The fuel and oxidant source 101 can include a fuel nozzle configured to emit a fuel stream and the air source configured to output combustion air adjacent to the fuel stream. The fuel nozzle and air source can be configured to output the fuel stream to be progressively diluted by the combustion air. The flame holder 102 can be disposed to receive a diluted fuel and oxidant mixture 219 that supports a combustion reaction 201 that is stabilized by the flame holder 102 when the flame holder 102 is at an operating temperature. A start-up flame holder, in contrast, can be configured to support a start-up flame at a location corresponding to a relatively rich fuel and oxidant mixture 219 that is stable without stabilization provided by the heated flame holder 102.

The burner system 200 can further include a controller 110 operatively coupled to the heater 114 and to a data interface. For example, the controller 110 can be configured to control a start-up flame holder actuator configured to cause the start-up flame holder to hold the start-up flame when the flame holder 102 needs to be pre-heated and to not hold the start-up flame when the flame holder 102 is at an operating temperature (e.g., when $T \geq T_S$).

Various approaches for actuating a start-up flame are contemplated. In one embodiment, the start-up flame holder includes a mechanically-actuated bluff body configured to be actuated to intercept the fuel and oxidant mixture 219 to cause heat-recycling vortices and thereby hold a start-up flame; or to be actuated to not intercept the fuel and oxidant mixture 219 to cause the fuel and oxidant mixture 219 to proceed to the flame holder 102. In another embodiment, a fuel control valve, blower, and/or damper may be used to select a fuel and oxidant mixture 219 flow rate that is sufficiently low for a start-up flame to be jet-stabilized; and upon reaching a flame holder 102 operating temperature, the flow rate may be increased to "blow out" the start-up flame. In another embodiment, the heater 114 may include an electrical power supply operatively coupled to the controller 110 and configured to apply an electrical charge or voltage to the fuel and oxidant mixture 219. An electrically conductive start-up flame holder may be selectively coupled to a voltage ground or other voltage selected to attract the electrical charge in the fuel and oxidant mixture 219. The attraction of the electrical charge was found by the inventors to cause a start-up flame to be held by the electrically conductive start-up flame holder.

In another embodiment, the heater 114 may include an electrical resistance heater configured to output heat to the flame holder 102 and/or to the fuel and oxidant mixture 219. The electrical resistance heater 114 can be configured to heat up the flame holder 102 to an operating temperature. The heater 114 can further include a power supply and a switch operable, under control of the controller 110, to selectively couple the power supply to the electrical resistance heater 114.

The electrical resistance heater 114 can be formed in various ways. For example, the electrical resistance heater 114 can be formed from KANTHAL® wire (available from Sandvik Materials Technology division of Sandvik AB of Hallstahammar, Sweden) threaded through at least a portion of the combustion channels 210 defined by the slats 104. Alternatively, the heater 114 can include an inductive heater, a high energy (e.g., microwave or laser) beam heater, a frictional heater, or other types of heating technologies.

Other forms of start-up apparatuses are contemplated. For example, the heater 114 can include an electrical discharge igniter or hot surface igniter configured to output a pulsed ignition to the air and fuel. Additionally or alternatively, a start-up apparatus can include a pilot flame apparatus disposed to ignite a fuel and oxidant mixture 219 that would otherwise enter the flame holder 102. An electrical discharge igniter, hot surface igniter, and/or pilot flame apparatus can be operatively coupled to the controller 110, which can cause the electrical discharge igniter or pilot flame apparatus to maintain combustion of the fuel and oxidant mixture 219 in or upstream from the flame holder 102 before the flame holder 102 is heated sufficiently to maintain combustion.

The burner system 200 can further include a sensor 112 operatively coupled to the control circuit 110. The sensor 112 can include a heat sensor configured to detect infrared radiation or a temperature of the flame holder 102. The control circuit 110 can be configured to control the heating apparatus 114 responsive to input from the sensor 112. Optionally, a fuel control valve can be operatively coupled to the controller 110 and configured to control a flow of fuel to the fuel and oxidant source 101. Additionally or alternatively, an oxidant blower or damper can be operatively coupled to the controller 110 and configured to control flow of the oxidant (or combustion air).

The sensor 112 can further include a combustion sensor operatively coupled to the control circuit 110, the combustion sensor being configured to detect a temperature, video image, and/or spectral characteristic of a combustion reaction 201 held by the flame holder 102. The fuel control valve can be configured to control a flow of fuel from a fuel source to the fuel and oxidant source 101. The controller 110 can be configured to control the fuel control valve responsive to input from the combustion sensor 112. The controller 110 can be configured to control the fuel control valve and/or oxidant blower or damper to control a preheat flame type of heater 114 to heat the flame holder 102 to an operating temperature. The controller 110 can similarly control the fuel control valve and/or the oxidant blower or damper to change the fuel and oxidant mixture 219 flow responsive to a heat demand change received as data via the data interface.

Figure 4:
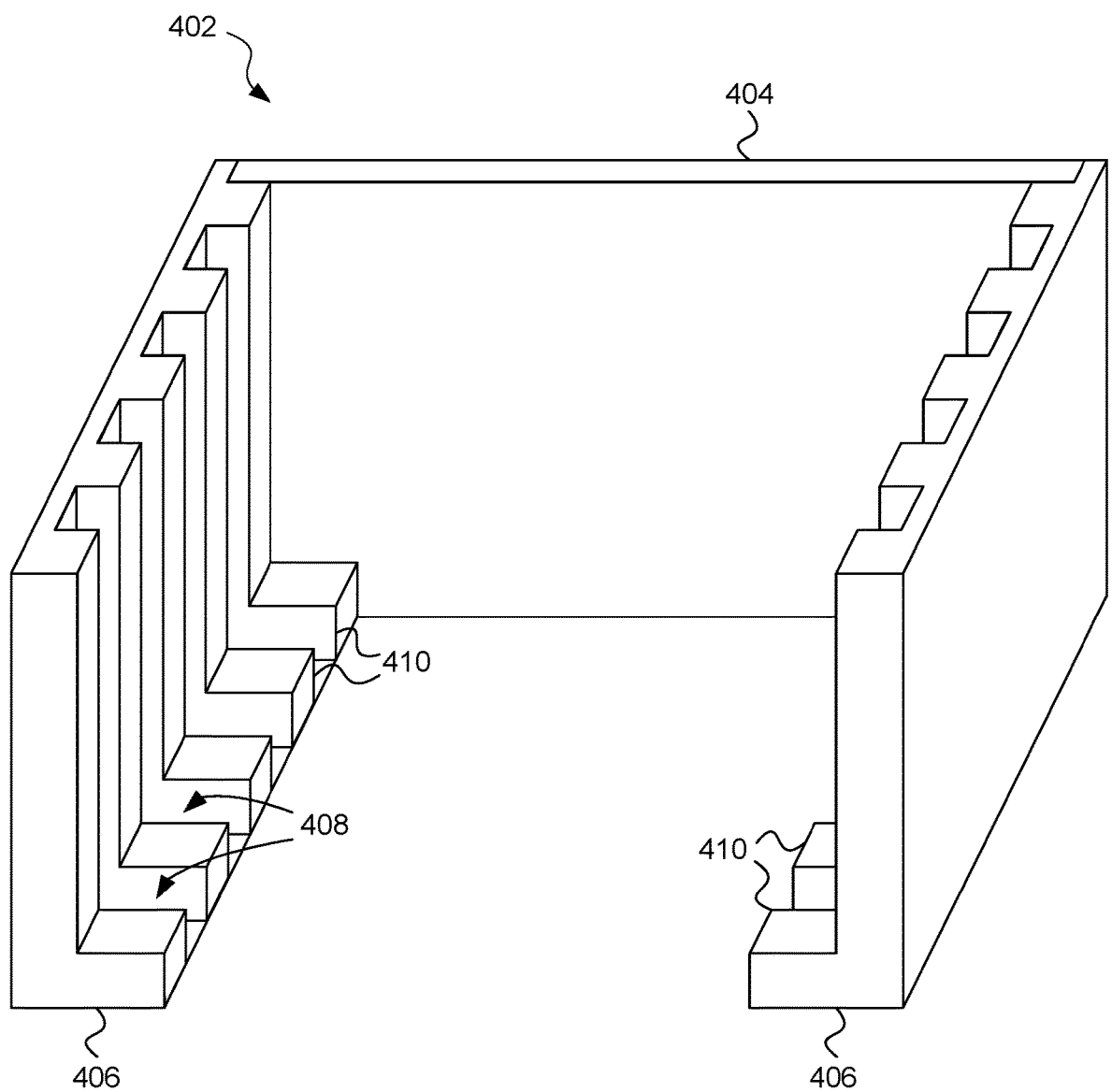
FIG. 4 is a diagram of a support structure for a flame holder, according to an embodiment.

FIG. 4 is a diagram of a flame holder 402, according to an embodiment. The flame holder 402 includes a flame holder support structure 406 and a slat 404. Only a single slat 404 is shown in FIG. 4 in order to more clearly illustrate the flame holder support structure 406. In practice, the flame holder 402 will include a plurality of slats 404.

The flame holder support structure 406 includes a plurality of slots 408 defined by support arms 410. The dimensions of the slots 408 are selected to hold the slats 404. In particular, each slot 408 is configured to hold a single slat 404. The flame holder support structure 406 holds an array of slats 404 in parallel with each other and extending in a direction transverse to the general direction of the output of the fuel and oxidant. When all of the slots 408 hold a slat 404, the flame holder 402 defines a plurality of combustion channels 210 between adjacent slats 404 as described previously.

Figure 5:
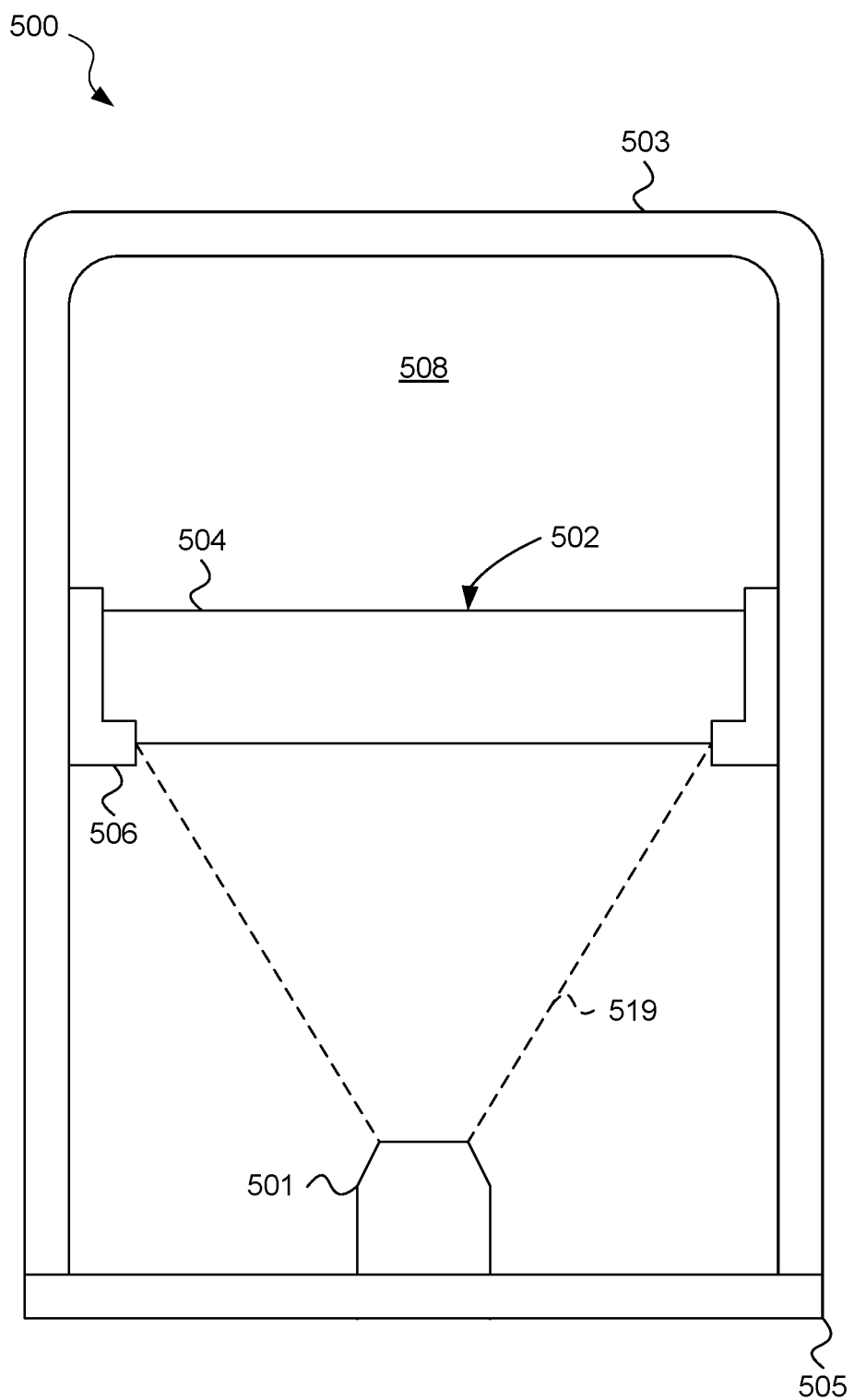
FIG. 5 is a diagram of a combustion system including an enclosure and a flame holder, according to an embodiment.

FIG. 5 is a diagram of a combustion system 500, according to an embodiment. The combustion system 500 includes an enclosure 503 defining a combustion volume 508. A fuel nozzle 501 is positioned within the combustion volume 508 near a floor 505 coupled to the enclosure 503. A flame holder 502 is positioned within the combustion volume 508. The flame holder 502 includes a plurality of slats 504 supported by support structure 506.

The fuel nozzle 501 is configured to output fuel and oxidant 519 onto the flame holder 502. The flame holder 502 sustains a combustion reaction 201 of the fuel and oxidant 519 primarily within the flame holder 502.

According to an embodiment, the slats 504 are arranged in an array extending in a direction transverse to a direction of output of the fuel and oxidant 519 from the fuel nozzle 501. The slats 504 are discrete slats positioned in parallel with each other. In particular, each slat 504 is separated from the next slat 504 by a selected distance. The arrangement of slats 504 in parallel defines a plurality of combustion channels 210 between the slats 504. Each combustion channel 210 has a width W that is the selected distance between adjacent slats 504. Only a single slat 504 of the plurality of slats 504 is visible in FIG. 5 due to the nature of the side view of the combustion system 500 in FIG. 5.

The fuel nozzle 501 outputs the fuel and oxidant 519 toward the flame holder 502. The fuel and oxidant 519 enters into the combustion channels 210 between the slats 504. The flame holder 502 sustains a combustion reaction 201 of the fuel and oxidant 519 primarily within the combustion channels 210 between the slats 504.

According to an embodiment, the length L of the combustion channels 210 corresponds to the height of the slats 504 in a direction along a general axis of travel of the fuel and oxidant 519 from the fuel nozzle 501. According to an embodiment, the length L of the combustion channels 210 is at least five times the width W of the combustion channels 210.

The support structure 506 includes two portions each mounted to an inner wall of the enclosure 503. The brackets 506 can be fixed to the inner wall of the enclosure 503 by any mounting mechanism suitable for a very high temperature environment. According to an embodiment, the support structure 506 can include a refractory material. The support structure 506 can be similar to the support structure 406 of FIG. 4. Alternatively, the support structure 506 can include other suitable structure for holding an array of slats 504. The support structure 506 holds the slats 504 at a selected position relative to the fuel nozzle 501. Additionally, the support structure 506 holds the discrete slats 504 in position relative to each other. Thus, the support structure 506 holds the slats 504 in an array in which the slats 504 extend parallel to each other and define fuel channels between adjacent slats 504.

Figure 6:
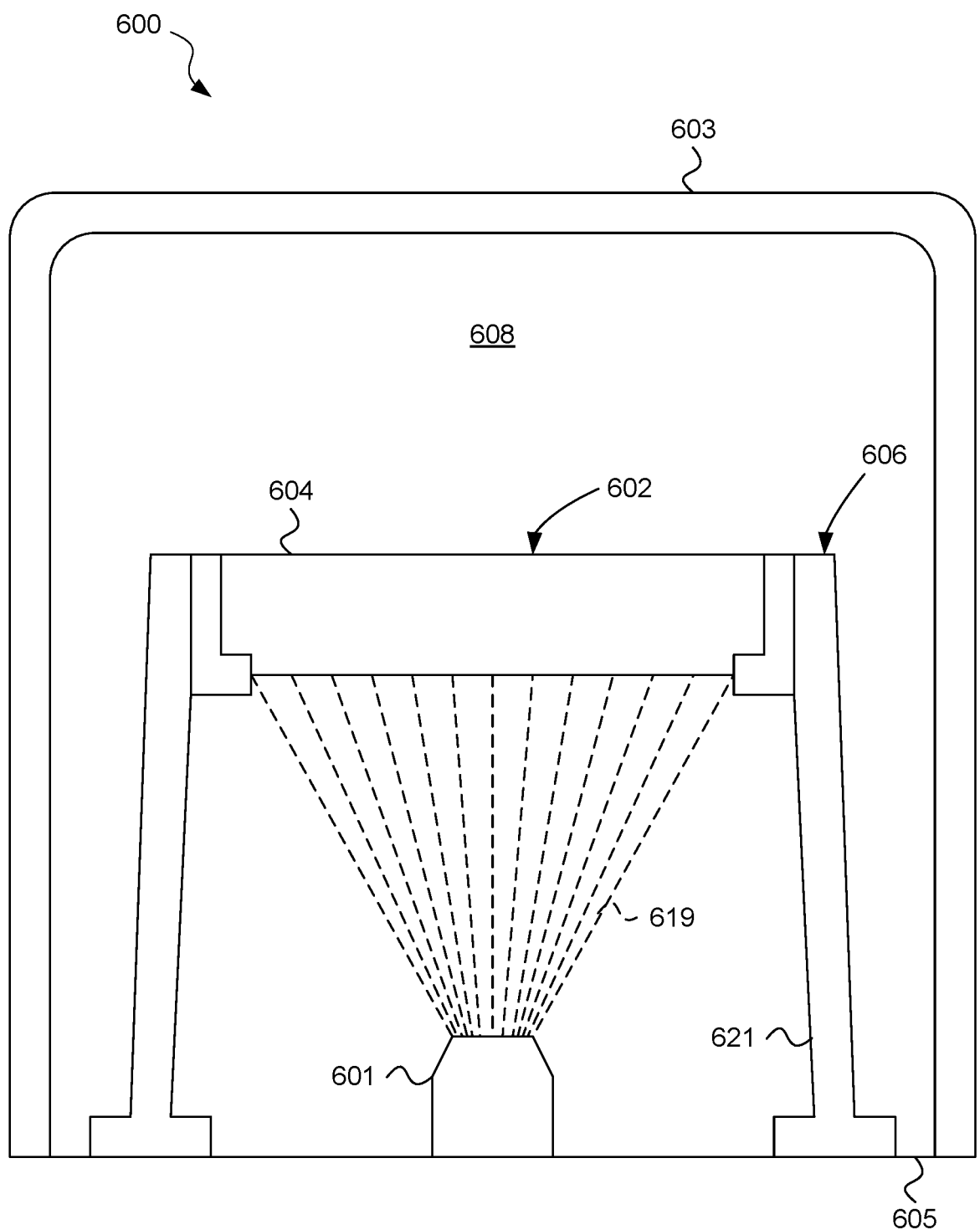
FIG. 6 is a diagram of a combustion system including a flame holder, according to an embodiment.

FIG. 6 is a diagram of a combustion system 600, according to an embodiment. The combustion system 600 includes an enclosure 603 defining a combustion volume 608. A fuel and oxidant source 601 is positioned within the combustion volume 608 near a floor 605 coupled to the enclosure 603. A flame holder 602 is positioned within the combustion volume 608. The flame holder 602 includes a plurality of slats 604 supported by support structure 606.

The fuel and oxidant source 601 is configured to output fuel and oxidant 619 onto the flame holder 602. The flame holder 602 sustains a combustion reaction 201 of the fuel and oxidant 619 primarily within the flame holder 602.

According to an embodiment, the slats 604 are arranged in an array extending in a direction transverse to a direction of output of the fuel and oxidant 619 from the fuel and oxidant source 601. The slats 604 are discrete slats 604 positioned in parallel with each other. In particular, each slat 604 is separated from the next slat 604 by a selected distance. The arrangement of slats 604 in parallel defines a plurality of combustion channels 210 between the slats 604. Each combustion channel 210 has a width W that is the selected distance between adjacent slats 604. Only a single slat 604 of the plurality of slats 604 is visible in FIG. 6 due to the nature of the side view of the combustion system 600 in FIG. 6.

The fuel nozzle 601 outputs the fuel and oxidant 619 toward the flame holder 602. The fuel and oxidant 619 enters into the combustion channels 210 between the slats 604. The flame holder 602 sustains a combustion reaction 201 of the fuel and oxidant 619 primarily within the combustion channels 210 between the slats 604.

According to an embodiment, the length L of the combustion channels 210 corresponds to the height of the slats 604 in a direction along an axis of travel of the fuel and oxidant 619 from the fuel and oxidant source 601. According to an embodiment, the length L of the combustion channels 210 is at least five times the width W of the combustion channels 210.

The support structure 606 includes two support structure portions each mounted to a floor 605 of the enclosure 603. Each support structure portion can include a respective support leg 621 that raises the flame holder 602 above the floor. The support structure 606 can be fixed to the floor 605 of the enclosure 603 by any suitable mounting mechanisms. According to an embodiment, the support structure 606 can include a refractory material. The support structure 606 can be similar to the support structure 406 of FIG. 4. Alternatively, the support structure 606 can include other suitable structure for holding an array of slats 604. The support structure 606 holds the slats 604 at a selected position relative to the fuel nozzle 601. Additionally, the support structure 606 holds the discrete slats 604 in position relative to each other. Thus, the support structure 606 holds slats 604 in an array in which the slats 604 extend parallel to each other and define fuel channels between adjacent slats 604.

Figure 7:
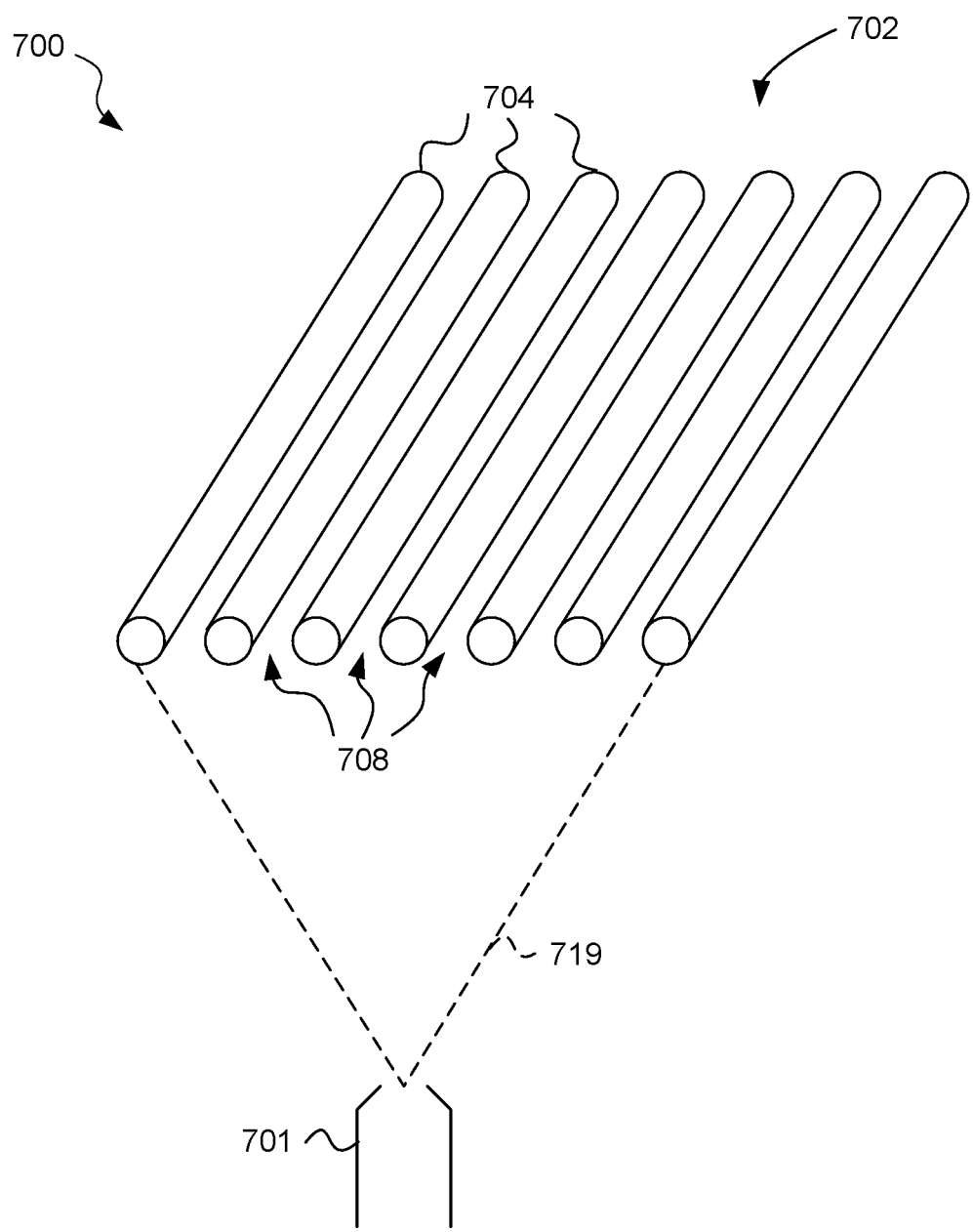
FIG. 7 is a diagram of elongated members of a flame holder, according to an embodiment.

FIG. 7 is a diagram of a combustion system 700 including a flame holder 702, according to an embodiment. The flame holder 702 includes a plurality of rods 704. According to an embodiment, the rods 704 may be cylindrical rods. The rods 704 are arranged in parallel a selected distance apart from each other. The gaps between adjacent rods 704 define combustion channel 708.

Though not shown, flame holder 702 includes a support structure configured to hold the rods 704 in positions relative to each other. In particular, the support structure holds the rods 704 a selected distance apart from each other and arranged in parallel to define the combustion channels 708. The support structure can include slots, grooves, brackets, or other mechanisms for holding the rods 704.

Figure 8:
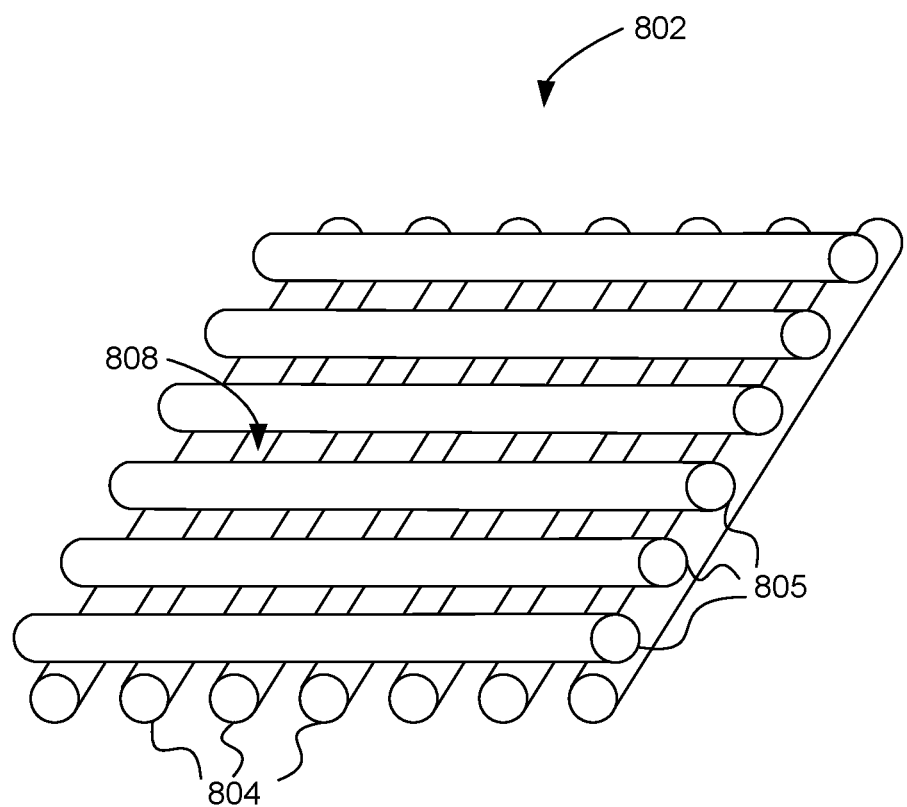
FIG. 8 is a diagram of elongated members of a flame holder, according to another embodiment.

FIG. 8 is a diagram of a flame holder 802, according to an embodiment. The flame holder 802 includes a plurality of rods 804 and 805. The rods 804 extend in a direction transverse to a direction of an output of the fuel and oxidant. The rods 805 extend in a direction transverse to both output the fuel and oxidant and to the rods 804. Rods 804, 805 form a crisscross pattern with the rods 805 on top of the rods 804. The rods 804, 805 define the combustion channels 808. The combustion channels 808 have a square cross-section when viewed from the top. However, the combustion channels 808 are not entirely isolated from each other due to the vertical offset between the rods 804, 805. Thus, the fuel and oxidant and the combustion reaction 201 of the fuel and oxidant can flow between combustion channels 808.

The rods 804, 805 are cylindrical rods. According to an embodiment, the rods 804 can have cross-sections other than circular. In particular, the rods 804 can include rectangular cross-sections, tapered cross-sections, or other cross-sections.

Though not shown, flame holder 802 includes a support structure configured to hold the rods 804 in positions relative to each other. In particular, the support structure holds the rods 804 a selected distance apart from each other and arranged in parallel to define the combustion channels 808. The support structure can include slots, grooves, brackets, or other mechanisms for holding the rods 804. While FIG. 8 has disclosed a flame holder 802 including rods 804, elongated members other than rods can be used instead of rods.

Figure 9:
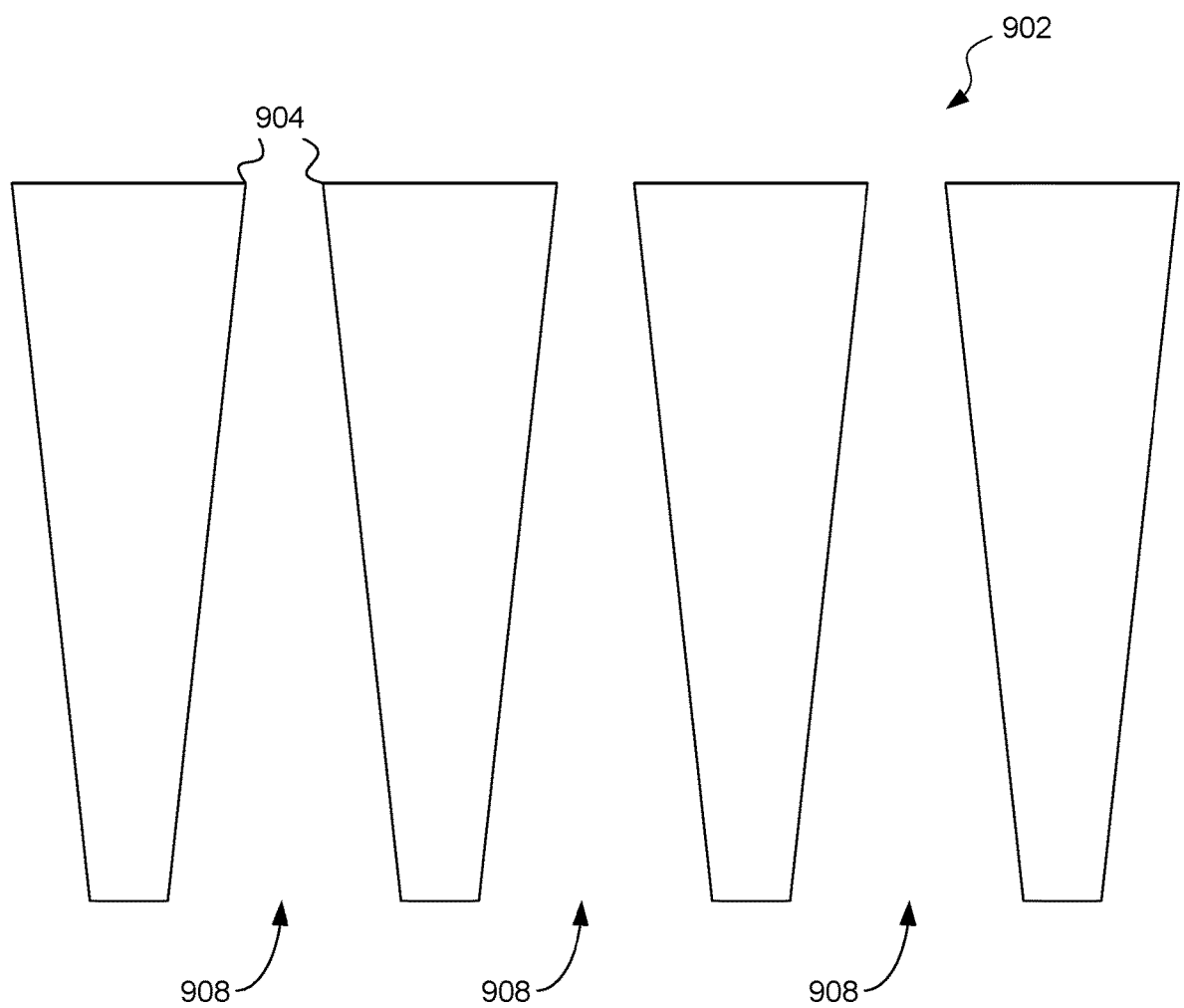
FIG. 9 is a cross-sectional diagram of tapered elongated members of a flame holder, according to an embodiment.

FIG. 9 is a cross-sectional diagram of a flame holder 902, according to an embodiment. The flame holder 902 includes a plurality of slats 904. The gap between adjacent slats 904 defines combustion channels 908. Due to the cross-sectional form of the slats 904, the combustion channel 908 has a ramjet or tapered shape. Fuel and oxidant enters into the combustion channels 908 at the wide bottom portion of the combustion channels 908. A combustion reaction of the fuel and oxidant occurs primarily within the combustion channels 908. Flue gases or uncombusted fuel and oxidant exit the combustion channels 908 at the narrower apertures defined by the tops of the slats 904.

Though not shown in FIG. 9, the flame holder 902 includes a support structure configured to hold the slats 904.

Figure 10:
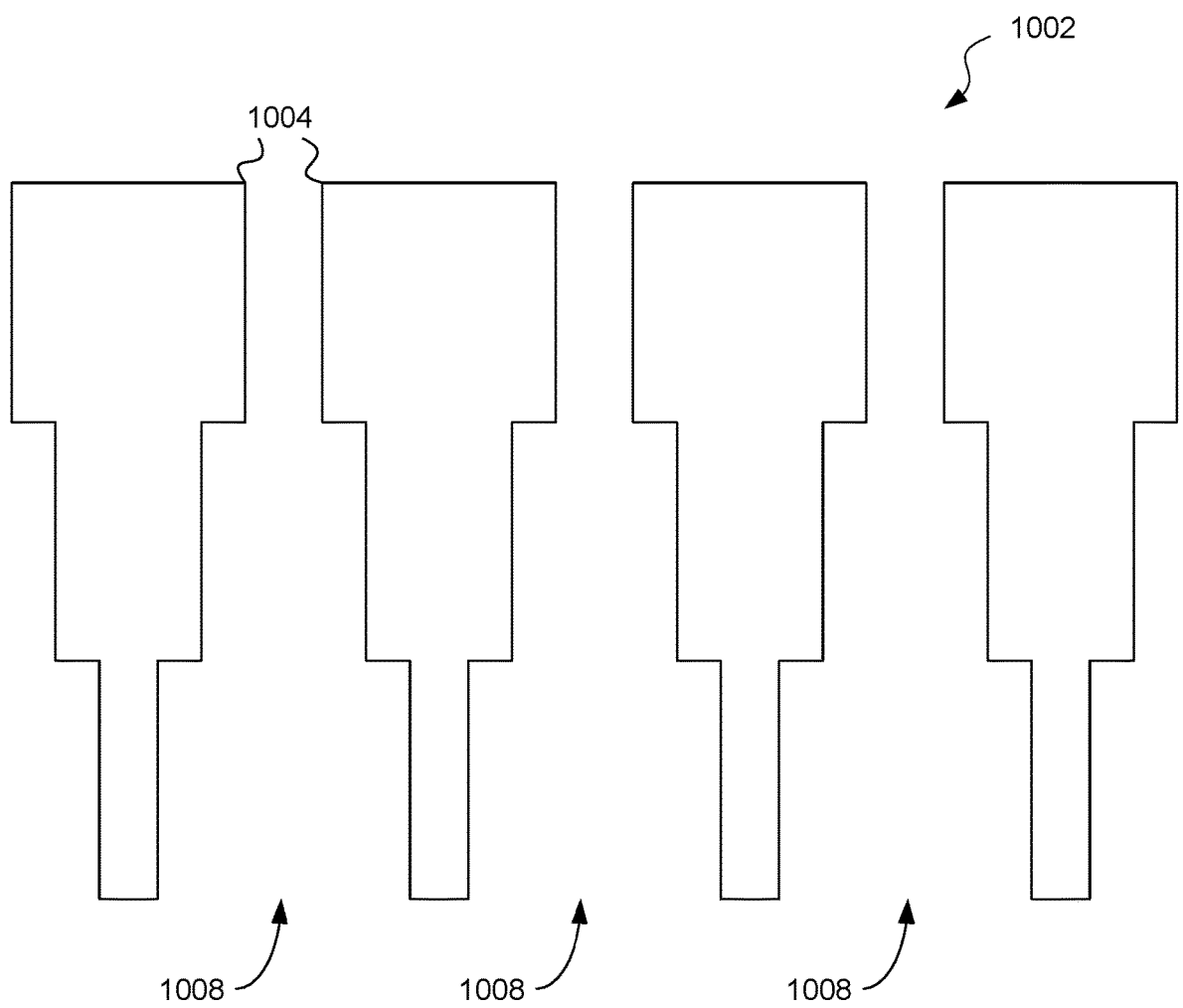
FIG. 10 is a cross-sectional diagram of stepped elongated members of a flame holder, according to an embodiment.

FIG. 10 is a cross-sectional diagram of a flame holder 1002, according to an embodiment. The flame holder 1002 includes a plurality of slats 1004. The gap between adjacent slats 1004 defines combustion channels 1008. Due to the cross-sectional form of the slats 1004, the combustion channel 1008 has a stepped shape. Fuel and oxidant enters into the combustion channels 1008 at the wide bottom portion of the combustion channels 1008. A combustion reaction of the fuel and oxidant occurs primarily within the combustion channels 1008. Flue gases or uncombusted fuel and oxidant exit the combustion channels 1008 at the narrower apertures at the top of the slats 1004.

Though not shown in FIG. 10, the flame holder 1002 includes a support structure configured to hold the slats 1004.

FIG. 11 is a flow diagram of a process 1100 for operating a combustion system according to an embodiment. At 1102, the process outputs fuel and oxidant from a fuel and oxidant source. At 1104, the process supports a plurality of slats adjacent to the fuel and oxidant source, the slats defining a plurality of combustion channels between adjacent slats, a width of the combustion channels corresponding to a distance between adjacent slats, a height of the combustion channels corresponding to a height of the slats along an axis corresponding to a general direction of output of the fuel and oxidant, the height being at least five times the width. At 1106, the process receives the fuel and oxidant into the combustion channels. At 1108, the process sustains a combustion reaction of the fuel and oxidant within the combustion channels.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:
   a fuel and oxidant source configured to output fuel and oxidant; and
   a flame holder including:
      a plurality of slats arranged such that a cross-sectional centerline of each slat is parallel with the cross-sectional centerline of each other slat, each slat having:
         a first edge proximal to the fuel and oxidant source; and
         a second edge distal from the fuel and oxidant source;
      a support structure including a plurality of at least first slots, each first slot formed to receive at least a first end face of a respective slat; and
      a plurality of combustion channels each between respective adjacent slats, each combustion channel having a width corresponding to a distance between the respective adjacent slats and a length corresponding to a distance between the first edge and the second edge of one of the respective adjacent slats, the length being at least five times the width, the flame holder being positioned to receive the fuel and oxidant into the combustion channels and to collectively hold a combustion reaction of the fuel and oxidant primarily within the combustion channels.

2. The combustion system of claim 1, wherein the plurality of first slots are formed to additionally receive an end portion of the first edge of a respective slat.

3. The combustion system of claim 1, wherein the support structure further includes a plurality of second slots each formed to receive at least an end portion of the second edge of a respective slat.

4. The combustion system of claim 3, wherein the support structure includes:
   a first support structure portion including the first slots; and
   a second support structure portion including the second slots.

5. The combustion system of claim 1, further comprising:
   a floor; and
   a wall, the floor and the wall together defining an enclosure, the flame holder being positioned within the enclosure.

6. The combustion system of claim 5, wherein the support structure is coupled to the wall.

7. The combustion system of claim 6, wherein the support structure is coupled to the floor.

8. The combustion system of claim 2, wherein the slots are rotatable and wherein rotating the slots causes the slats to rotate.

9. The combustion system of claim 1, wherein the slats are shaped such that the combustion channels have a cross-sectional area that tapers with distance form the first edges to the second edges of adjacent slats.

10. The combustion system of claim 1, wherein the width of the combustion channels corresponds to a shortest distance between the respective adjacent slats.

11. The combustion system of claim 1, wherein the slats are shaped such that the combustion channels have a stepped cross-section.

12. The combustion system of claim 1, wherein the slats have a rectangular cross-section.

13. The combustion system of claim 12, wherein the combustion channels have a rectangular cross-section.

14. The combustion system of claim 1, further comprising a heater configured to heat the slats to a selected temperature.

15. The combustion system of claim 1, wherein each slat includes a refractory material.

16. The combustion system of claim 15, wherein the refractory material includes one or more of Mullite, Cordierite, silicon carbide, zirconia, fused quartz, and fiber reinforced cementatious material.

17. The combustion system of claim 16, wherein the slats are straight walled slats.

18. The combustion system of claim 17, wherein one or more of the combustion channels have a constant width along the length of the one or more combustion channels.

19. The combustion system of claim 1, wherein the slats have a shape that maintains a width of the combustion channels greater than a quench distance of the combustion reaction.

20. The combustion system of claim 16, wherein the slats are shaped such that the width of each combustion channel is tapered in a continuous manner along the length of the combustion channel.

21. A combustion system, comprising:
a fuel and oxidant source configured to output fuel and oxidant; and
a flame holder configured to receive the fuel and oxidant and to hold a combustion reaction of the fuel and oxidant, the flame holder including:
a plurality of slats each having:
a first edge proximal to the fuel and oxidant source;
a second edge distal to the fuel and oxidant source; and
a straight wall extending between the first edge and the second edge; and
a support structure including a plurality of slots collectively configured to hold the slats in an arrangement such that the slats extend substantially parallel to each other and define a plurality of combustion channels each between respective adjacent slats, a width of each combustion channel corresponding to a shortest distance between respective adjacent slats, a length of each combustion channel corresponding to a distance between the first edge and the second edge of one of the adjacent slats, the length being at least five times the width, the combustion channels being configured to receive the fuel and oxidant and to collectively hold the combustion reaction within the combustion channels, wherein
the slots of the support structure are each formed to receive an end face of a respective slat.

22. The combustion system of claim 21, wherein the slats have a shape that maintains a width of the combustion channels greater than a quench distance of the combustion reaction.

23. A combustion system, comprising:
a fuel and oxidant source configured to output fuel and oxidant; and
a flame holder positioned to receive the fuel and oxidant, the flame holder including:
an array of elongated members arranged in parallel with each other and transverse to a general direction of flow of the fuel and oxidant, the elongated members defining a plurality of combustion channels between adjacent elongated members, a width of each combustion channel being a distance between adjacent elongated members, a height of each combustion channel corresponding to a height of the elongated members on an axis corresponding to a general direction of output of the fuel and oxidant from the fuel and oxidant source, the height being at least five times the width, the flame holder being configured to sustain a combustion reaction of the fuel and oxidant primarily within the combustion channels; and
a support structure holding the array of elongated members, the support structure including a plurality of slots each disposed and shaped to receive at least an end face of a corresponding elongated member.

24. The combustion system of claim 23, wherein the elongated members have a rectangular cross-section.

25. The combustion system of claim 24, wherein the elongated members are slats.

26. The combustion system of 23, wherein the elongated members are rods.

27. The combustion system of claim 26, wherein the elongated members have a circular cross-section.

28. A combustion system, comprising:
a fuel and oxidant source configured to output fuel and oxidant; and
a flame holder positioned to receive the fuel and oxidant, the flame holder including:
an array of elongated members arranged in parallel with each other and defining a plurality of combustion channels between adjacent elongated members, a width of each combustion channel being a distance between adjacent elongated members, a height of each combustion channel corresponding to a height of the elongated members on an axis corresponding to a general direction of output of the fuel and oxidant from the fuel and oxidant source, the height being at least five times the width, the flame holder being configured to sustain a combustion reaction of the fuel and oxidant primarily within the combustion channels; and
a support structure holding the array of elongated members, wherein each elongated member includes a heater configured to heat the elongated members to a selected temperature.

29. The combustion system of claim 23, wherein each elongated member includes a refractory material.

30. The combustion system of claim 29, wherein the refractory material includes one or more of Mullite, Cordierite, silicon carbide, zirconia, fused quartz, and fiber reinforced cementatious material.

31. The combustion system of claim 23, wherein the combustion channels have a cross-sectional area that tapers with distance from first edges to second edges of adjacent elongated members, the first edge of each elongated member being proximate to the fuel and oxidant source and the second edge of each elongated member being distal from the fuel and oxidant source.

32. The combustion system of claim 23, wherein the combustion channels have a stepped cross-section.

33. The combustion system of claim 23, wherein the support structure includes:
 a rotation mechanism configured to rotate the slots, thereby rotating the elongated members about respective longitudinal axes of the elongated members.

34. The combustion system of claim 23, comprising an enclosure defining a combustion volume housing the flame holder and the fuel and oxidant source and including at least one wall and a floor.

35. The combustion system of claim 34, wherein the support structure is mounted to the wall of the enclosure.

36. The combustion system of claim 23, wherein each elongated member has a straight wall extending between the first edge and the second edge.

\* \* \* \* \*

UNITED STATES PATENT AND TRADEMARK OFFICE
CERTIFICATE OF CORRECTION

| | |
|---|---|
| PATENT NO. | : 11,435,143 B2 |
| APPLICATION NO. | : 16/166509 |
| DATED | : September 6, 2022 |
| INVENTOR(S) | : Donald Kendrick et al. |

It is certified that error appears in the above-identified patent and that said Letters Patent is hereby corrected as shown below:

In the Claims

At Column 17, Line 6, in the third line of Claim 9, change "form" to --from--.

Signed and Sealed this
Tenth Day of October, 2023

*Katherine Kelly Vidal*

Katherine Kelly Vidal
*Director of the United States Patent and Trademark Office*